US011419379B2

(12) United States Patent
Morgan

(10) Patent No.: US 11,419,379 B2
(45) Date of Patent: Aug. 23, 2022

(54) COMPRESSIBLE DAMPING SYSTEM FOR BODY PART PROTECTION

(71) Applicant: Donald Edward Morgan, Brisbane (AU)

(72) Inventor: Donald Edward Morgan, Brisbane (AU)

(*) Notice: Subject to any disclaimer, the term of this patent is extended or adjusted under 35 U.S.C. 154(b) by 444 days.

(21) Appl. No.: 16/432,482

(22) Filed: Jun. 5, 2019

(65) Prior Publication Data

US 2019/0328073 A1 Oct. 31, 2019

Related U.S. Application Data

(63) Continuation-in-part of application No. PCT/IB2017/050458, filed on Jan. 27, 2017, which is
(Continued)

(30) Foreign Application Priority Data

| Jul. 30, 2015 | (AU) | ................................ | 2015903032 |
| Dec. 12, 2015 | (AU) | ................................ | 2015905148 |

(51) Int. Cl.
    *A42B 3/12* (2006.01)
    *F16F 1/373* (2006.01)
    *F16F 3/087* (2006.01)

(52) U.S. Cl.
    CPC .............. *A42B 3/124* (2013.01); *A42B 3/125* (2013.01); *F16F 1/3732* (2013.01); *F16F 3/0876* (2013.01)

(58) Field of Classification Search
    CPC ......... A42B 3/063; A42B 3/064; A42B 3/065; A42B 3/10; A42B 3/12; A42B 3/124; A42B 3/128
    (Continued)

(56) References Cited

U.S. PATENT DOCUMENTS

| 3,254,883 A | 6/1966 | Morgan |
| 4,024,586 A | 5/1977 | Lamb |
(Continued)

FOREIGN PATENT DOCUMENTS

| CN | 203040825 U | 7/2013 |
| JP | 2007 254920 A | 10/2007 |
(Continued)

OTHER PUBLICATIONS

Motorcycle and Bicycle Protective Helmets: Requirements Resulting from a Post Crash study and Experimental Research, J.P. Corner et al., 1987, Report No. CR 55, Federal Office of Road Safety, Canberra.
(Continued)

*Primary Examiner* — Jameson D Collier
(74) *Attorney, Agent, or Firm* — Gordon & Jacobson, P.C.

(57) ABSTRACT

A body part protector includes an inner layer defining an interior space that is configured to be occupied by a human body part, an outer layer connected to the inner layer and forming at least one chamber therebetween, and a plurality of separate dampers. A damper is at least partially disposed in the chamber. Each damper extends into the interior space along a respective longitudinal axis. Each damper has an outer end disposed at a fixed position relative to the outer layer and an inner end disposed longitudinally opposite the outer end in the interior space. The protector includes a plurality of separate engagement members corresponding to the plurality of dampers. Each engagement member is disposed at the inner end of the corresponding damper and is configured to engage the body part of the user. Each damper includes a plurality of compressible damper elements concentrically arranged about the longitudinal axis.

26 Claims, 23 Drawing Sheets

Related U.S. Application Data a continuation-in-part of application No. 15/223,452, filed on Jul. 29, 2016, now Pat. No. 10,349,697.

(58) Field of Classification Search
USPC .............................. 2/410–412, 414, 425, 455
See application file for complete search history.

(56) References Cited

U.S. PATENT DOCUMENTS

| | | | |
|---|---|---|---|
| 5,204,998 A | 4/1993 | Liu | |
| 7,082,623 B2* | 8/2006 | Johnson | A41D 19/01523 2/413 |
| 8,060,951 B2 | 11/2011 | Smith | |
| 8,756,719 B2 | 6/2014 | Veazie | |
| 8,814,150 B2 | 8/2014 | Ferrara et al. | |
| 8,955,169 B2 | 2/2015 | Weber et al. | |
| 10,349,697 B2 | 7/2019 | Morgan | |
| 2010/0186150 A1 | 7/2010 | Ferrara et al. | |
| 2012/0198604 A1* | 8/2012 | Weber | A42B 3/125 2/414 |
| 2013/0000015 A1* | 1/2013 | Marzec | A42B 3/12 2/411 |
| 2013/0025032 A1* | 1/2013 | Durocher | A42B 3/12 2/414 |
| 2013/0125294 A1 | 5/2013 | Ferrara | |
| 2013/0291289 A1 | 11/2013 | Szalkowski et al. | |
| 2013/0340150 A1 | 12/2013 | Brantley | |
| 2014/0007322 A1 | 1/2014 | Marz | |
| 2014/0013491 A1 | 1/2014 | Hoshizaki et al. | |
| 2014/0059746 A1* | 3/2014 | Olivares Velasco | A41D 13/015 2/414 |
| 2014/0068841 A1 | 3/2014 | Brown | |
| 2014/0208486 A1 | 7/2014 | Krueger | |
| 2014/0373257 A1* | 12/2014 | Turner | A42B 1/0183 2/414 |
| 2015/0052669 A1 | 2/2015 | Yoon | |
| 2015/0089724 A1 | 4/2015 | Berry | |
| 2015/0157083 A1* | 6/2015 | Lowe | A42B 3/128 2/412 |
| 2015/0223547 A1* | 8/2015 | Wibby | A42B 3/064 2/414 |
| 2015/0305427 A1 | 10/2015 | Prabhu et al. | |
| 2016/0021965 A1 | 1/2016 | Mayerovitch | |
| 2016/0029730 A1 | 2/2016 | Day | |
| 2016/0058092 A1 | 3/2016 | Aldino et al. | |
| 2018/0228239 A1 | 8/2018 | Day | |

FOREIGN PATENT DOCUMENTS

| | | |
|---|---|---|
| KR | 20-0413824 | 4/2006 |
| KR | 10-1392144 B1 | 5/2014 |
| WO | WO 2010-001230 A1 | 1/2010 |
| WO | WO2011/153309 A2 | 12/2011 |

OTHER PUBLICATIONS

The Influence of Reduced Friction on Head Injury Metrics in Helmeted Head Impacts, John D. Finan et al., 2008, Traffic Injury Prevention, 9:5, 483-488, DOI: 10.1080/15389580802272427.

Head Protection Devices, Bertil Aldman, 1984, The Biomechanics of Impact Trauma, Elsevier Science Publishers B.V., pp. 413-416.

Pathophysiology. In Traumatic Brain Injury, A.L. Halliday, 1999, ed. D.W. Marion, 29-31. New York: Thieme.

Research and Innovation; POC Sports; archived on Dec. 4, 2013 at https://web.archive.org/web/20131204023915/http://www.pocsports.com/en/content/view/protective-concepts.

Introducing MIPS Technology; Bell Helmets; archived on Dec. 17, 2014 at https://web.archive.org/web/20141217134604/http://www.bellhelmets.com/mips.

6D, Advanced Impact Defense; Omni-Directional Suspension, archived on Dec. 19, 2014 at https://web.archive.org/web/20141219001632/http://www.6dhelmets.com/#!ods/c10b6.

Lazer Helmets; Innovation and Technology; SuperSkin; archived on Apr. 11, 2012 at https://web.archive.org/web/20120411071621/http://www.lazerhelmets.com/innovations/superskin/.

Leatt Unveils Helmet Prototypes; Jun. 19, 2014; http://leatt-corp.com/press-releases/leatt-unveils-helmet-prototypes/.

Motoweek; Leatt Corporation, GPX helmet; http://idnmotoweek.blogspot.com/2014_11_30_archive.html; Friday Dec. 5, 2014.

Supplemental European Search Report and Written Opinion dated Apr. 10, 2019 of Application No. EP16 82 9944.

International Search Report and Written Opinion dated Nov. 25, 2016 of Application No. PCT/IB2016/054573.

International Search Report and Written Opinion dated Oct. 27, 2017 of Application No. PCT/IB2017/050458.

* cited by examiner

COMPRESSIBLE DAMPING SYSTEM FOR BODY PART PROTECTION

CROSS-REFERENCE TO RELATED APPLICATIONS

This is a continuation-in-part of International Patent Application PCT/IB2017/050458, filed Jan. 27, 2017, and is a continuation-in-part of U.S. application Ser. No. 15/223,452, filed Jul. 29, 2016, which claims priority to Australian Provisional Patent Application No. 2015905148, filed on Dec. 12, 2015 and to Australian Provisional Patent Application No. 2015903032, filed on Jul. 30, 2015, the entire contents of all of which are hereby incorporated by reference.

BACKGROUND

1. Field

The present application relates to impact protection, and more specifically, to impact protection for parts of the body, such as the head.

2. State of the Art

An impact to a moving head can cause the skull to rapidly decelerate, while inertia keeps the brain travelling forward to impact the inside surface of the skull. Such impact of the brain against the skull may cause bruising (contusions) and/or bleeding (hemorrhage) to the brain. Therefore, deceleration of the head is an important factor to consider in determining the severity of brain injuries caused by impact to the head.

In all types of impacts to the head, the head is subjected to a combination of linear acceleration and rotational acceleration. Linear acceleration is considered to contribute to focal brain injuries, while rotational acceleration is considered to contribute to both focal and diffuse brain injuries.

Helmets may be used to protect the head from impacts. All helmets add at least some added mass to the head of its wearer. However, adding mass to a helmet can increase the rotational acceleration and deceleration effects to the head and brain as compared to a helmet of a smaller mass.

Protective helmets are used in many environments. In sports, such as football, players wear helmets to protect their heads from repetitive impacts resulting from playing the game. The majority of current technology used in helmets uses foam padding which is only suitable for very low impacts and to provide comfort. Also, such protective helmets using foam padding typically offer only one level of compression, which is only suitable to absorb the impact forces for impacts less than 100 g's.

In addition to foam helmet liners, various other impact protection technologies have been proposed for use in helmets to address linear and/or rotational acceleration. Such technologies include Omni Directional Suspension™ OMNI-DIRECTIONAL SUSPENSION™ (ODS™, in-helmet suspension and kinetic energy management system), Multiple Impact Protection System MULTIPLE IMPACT PROTECTION SYSTEM® (MIPS®, protective headgear incorporating protective components and fittings), SUPERSKIN® (elastic lubricated membrane), and 360° Turbine Technology.

In a helmet with Omni Directional Suspension™ OMNI-DIRECTIONAL SUSPENSION™ (ODS™) the outer shell and the liner are separated by ODS™ components. However, the ODS™ components add mass and bulk to the helmet. Also, the ODS™ components include hard components adhered to the inside of the outer shell. As a result, the ODS™ system requires the use of a hard and stiff liner to accommodate the hard components. Moreover, there is a possibility of individual ODS™ components detaching due to wear and tear.

In a helmet that incorporates the MIPS®, the helmet includes an outer shell, an inner liner, and a low friction layer. The low friction layer is located on the inside of the foam liner against the head, such that the shock absorbing foam liner is not in direct contact with the head. However, the use of the friction layer and its attachments reduces the ability of the helmet to effectively absorb an impact force. Moreover, MIPS® technology adds mass and bulk to the helmet.

In a helmet with SUPERSKIN®, a layer of a membrane and lubricant is applied to the outer shell of the helmet. The layer reduces friction between the outer shell and the impacting surface thereby reducing angular (rotational) effects on the head and brain.

In a helmet with 360° Turbine Technology multiple circular turbines are located on the inside of the foam liner against the head. While the technology adds minimal mass to the helmet, portions of the turbines may dislodge from wear and tear and, therefore, may not provide protection to the wearer of the helmet during an impact.

With the exception of SUPERSKIN®, the above-mentioned helmet technologies do not take into account the whole thickness and mass of the helmet as a factor in limiting deceleration. Also, the above-mentioned helmet technologies encourage the incorporation of harder and stiffer liners (expanded polystyrene (EPS) foam and other foams). However, harder and stiffer liners may be detrimental to a helmet's effectiveness to absorb translational and angular impact forces.

Additionally, some helmets employ rubber cylinders within a liner of the helmet between the wearers head and an outer skin or shell of the helmet. Such rubber cylinders are configured to have a neutral state in which they contain air. During an impact involving the helmet, the wearer's head compresses the liner and the rubber cylinders, which, when compressed, release the air contained in the cylinder through a valve or opening. After the impact, the cylinders expand and refill with air. However, such air-filled rubber cylinders offer only one level of compression and protection against low impact forces, which is not useful for protecting against more severe impact forces that may be experienced by a wearer of the helmet.

SUMMARY

Impact types may be classified as impacts involving a translational (linear) force and impacts involving a rotational force, which may occur together in an impact or separately. For impacts involving a pure translational force, the helmeted head of the rider undergoes rapid acceleration or deceleration movement in a straight line without rotating about the brain's center of gravity, which is located in the pineal region of the brain. For impacts involving a pure rotational force, the helmeted head undergoes rapid rotational acceleration or deceleration about the brain's center of gravity.

This application relates to improved head protection against repetitive impact forces (or shock). The impact forces may include translational and rotational forces to the head. As used herein, translational forces are those forces resolved in a direction normal or perpendicular to the skull of the head, and rotational forces are those forces resolved in a direction tangential to the skull of the head or perpendicular to the translational forces causing the head to rotate about its center of rotation. In particular, this application relates to head protection systems that include helmets, such as sporting (e.g., football, hockey) and construction helmets, which incorporate compressible energy absorbers to protect against repetitive impact forces to the head.

While certain embodiments are directed to protection for the head, it will be appreciated that the disclosure is applicable to protection for other parts of the human body as well which may be subject to translational and/or rotational impact forces, such as shoulders, knees, and elbows. Thus, while reference is made throughout the disclosure to certain example embodiment of body protectors that protect the head as a body part, it will be appreciated that the same or similar structures may be used for the protection of human body parts other than the head, such as the shoulders, knees, and elbows.

According to one aspect of the disclosure, a head protection system includes a helmet and at least one compressible energy absorber, hereinafter referred to as a "damper", which is coupled to the helmet to offer protection to a wearer of the helmet against repetitive impact forces. The damper(s) may be coupled to one or more of an outer shell and an inner liner of a helmet. For example, the dampers may be mechanically fastened or adhered to at least one of the interior surface of an outer shell and/or the liner (e.g., expanded polystyrene foam or any other suitable liner materials) of the helmet. The outer shell of the helmet may be hard or soft, such as vinyl outer covering. The dampers may be made of one or more suitable materials, such as silicone rubber.

The damping system is configured to respond to repetitive impact forces (translational and rotational) that are being applied externally to the outer surface of the helmet. The damping system can be incorporated in all types of helmets, including sports helmets and construction helmets. In contrast to the prior art, the dampers described herein provide multiple levels of compression and energy absorption for a wider range of magnitude of impact forces.

According to one aspect, further details of which are described herein, a system for protecting a head of a wearer from an impact force includes a helmet defining an interior space for housing the head, and at least one damper coupled to the helmet at a first end and extending therefrom along a longitudinal axis to a second end. The damper may be comprised of a plurality of compressible energy damper elements concentrically arranged about the longitudinal axis. The plurality of compressible energy damper elements may include at least an outer damper element and an inner damper element, where the outer damper element surrounds the inner damper element and extends to the second end of the damper.

The outer damper element has a first uncompressed length and the inner element has a second uncompressed length that is different from the first uncompressed length.

The first uncompressed length of the outer damper element may be longer than the second uncompressed length of the inner damper element. Also, the plurality of concentrically arranged compressible energy damper elements may include at least one intermediate damper element concentrically arranged between the outer and inner energy damper elements. The at least one intermediate damper element may have a third uncompressed length that is less than the first uncompressed length and greater than the second uncompressed length. The system may include a head stabilizer, which is attached to the outer damper element at the second end of the damper, and which is configured to engage the head of the wearer when the helmet is worn by the wearer.

The system may include a plurality of dampers coupled to the helmet, and the dampers may be arranged in an X-shaped pattern. A portion of the damper may be seated inside one or more openings defined in at least one of an inner liner and an outer shell of the helmet.

The inner damper element may have a free end that is longitudinally spaced between the first and second ends of the damper. The plurality of concentrically arranged compressible energy damper elements may each have a compressible, convoluted cylindrical wall spaced radially from each other. The wall of the inner damper element may be thicker than the wall of the outer damper element. The inner damper element may be a cone having a tip spaced longitudinally between the first and second ends of the damper.

Responsive to an impact force below a predetermined threshold applied to the helmet, the outer damper element may be compressed independently of the inner damper element, and responsive to an impact force above the predetermined threshold applied to the helmet, the outer damper element and the inner damper element may both be compressed.

According to another aspect, further details of which are described herein, a system for protecting a head of a wearer from an impact force includes a helmet defining an interior space for housing the head, and at least one damper coupled to the helmet at a first end and extending therefrom along a longitudinal axis to a second end. The damper may be comprised of a plurality of concentric compressible energy damper elements including at least a first damper element having a first length and a second damper element having a second length, and each energy damper element is arranged end to end along the axis in a serial configuration along the radial direction.

The first damper element may extend from the first end of the damper and the second damper element extends from the second end of the damper, and the first damper element has a first stiffness and the second damper element has a second stiffness different from the first stiffness. The first stiffness may be greater than the second stiffness. The first damper may have a wall thickness that is greater than a wall thickness of the second damper.

According to yet another aspect, a system for protecting a head of a wearer from an impact force includes a helmet defining an interior space for housing the head, and at least one damper coupled to the helmet at a first end and extending therefrom along a longitudinal axis to a second end. The damper is comprised of a plurality of concentric compressible energy damper elements including at least a cylindrical outer damper element and a conical inner damper element surrounded by the outer damper element. The outer damper element has a first uncompressed length and the inner element has a second uncompressed length that is less than the first length.

The conical inner damper element may have a circular base at a first end of the conical inner damper element and have a tip at a second end of the conical inner damper. The cylindrical outer damper has a first end attached to the base of the inner damper and a second end spaced longitudinally from the tip of the inner damper. The conical inner damper element may have a stiffness that is a function of longitudinal position.

According to another aspect, further details of which are described herein, a headguard for protecting a head of a user from impact forces includes an inner layer defining an interior space that is occupied by the user's head, an outer layer joined to the inner layer and forming at least one chamber therebetween, and a plurality of separate and distinct dampers. At least one damper is at least partially disposed in the chamber. Each damper extends into the interior space along a respective longitudinal axis. Each respective damper has a fixed outer end disposed at a fixed position relative to the outer layer and a free inner end disposed longitudinally opposite the fixed outer end in the interior space. Also, the headguard includes a plurality of separate and distinct engagement members corresponding to the plurality of dampers. Each engagement member is disposed at the free inner end of the corresponding damper and is configured to engage the head of the user. Each damper includes a plurality of compressible damper elements concentrically arranged about the longitudinal axis. The plurality of compressible energy damper elements include an inner conical damper element, a first cylindrical damper element surrounding the conical damper element, and a second cylindrical damper element surrounding the first cylindrical damper element and the conical damper element.

According to another aspect, further details of which are described herein, a helmet for protecting a head of a user from impact forces includes an outer shell, and an inner layer joined to the outer shell and defining an interior space that is occupied by the user's head. The inner layer defines a plurality of boreholes therein. Also, the helmet includes a plurality of separate and distinct dampers, one of each damper being at least partially disposed in a corresponding one of the boreholes. Each damper extends into the interior space along a respective longitudinal axis coaxial with the corresponding borehole. Each respective damper has a fixed outer end disposed at a fixed position relative to the outer layer and a free inner end disposed longitudinally opposite the fixed outer end in the interior space. Also, the helmet includes a plurality of separate and distinct engagement members corresponding to the plurality of dampers. Each engagement member is disposed at the free inner end of the corresponding damper and is configured to engage the head of the user. Each damper includes a plurality of compressible damper elements concentrically arranged about the longitudinal axis. The plurality of compressible energy damper elements includes an inner conical damper element, a first cylindrical damper element surrounding the conical damper element, and a second cylindrical damper element surrounding the first cylindrical damper element and the conical damper element.

In accordance with yet another aspect, further details of which are described herein, a headguard for protecting a head of a user from impact forces includes an inner layer defining an interior space that is occupied by the user's head, an outer layer joined to the inner layer and forming at least one chamber therebetween, and a plurality of separate and distinct dampers. At least one damper is at least partially disposed in the chamber. Each damper extends into the interior space along a respective longitudinal axis. Each respective damper has a fixed outer end disposed at a fixed position relative to the outer layer and a free inner end disposed longitudinally opposite the fixed outer end in the interior space. Further, the headguard includes a plurality of separate and distinct engagement members corresponding to the plurality of dampers. Each engagement member is disposed at the free inner end of the corresponding damper and is configured to engage the head of the user. Each damper includes a plurality of compressible damper elements concentrically arranged about the longitudinal axis, the plurality of damper elements including a plurality of linear damper elements and a non-linear damper element. The linear damper elements may include cylindrical damper elements and the non-linear damper element may be a conical damper element.

In yet another aspect, further details of which are described herein, a helmet for protecting a head of a user from impact forces includes an outer shell, an inner layer joined to the outer shell and defining an interior space that is occupied by the user's head, the inner layer defining a plurality of boreholes therein. Also, the helmet includes a plurality of separate and distinct dampers, one of each damper being at least partially disposed in a corresponding one of the boreholes. Each damper extends into the interior space along a respective longitudinal axis coaxial with the corresponding borehole. Each respective damper has a fixed outer end disposed at a fixed position relative to the outer layer and a free inner end disposed longitudinally opposite the fixed outer end in the interior space. Further, the helmet includes a plurality of separate and distinct engagement members corresponding to the plurality of dampers. Each engagement member is disposed at the free inner end of the corresponding damper and is configured to engage the head of the user. Each damper includes a plurality of compressible damper elements concentrically arranged about the longitudinal axis, the plurality of damper elements including a plurality of linear damper elements and a non-linear damper element. The linear damper elements may include cylindrical damper elements and the non-linear damper element may be a conical damper element.

DETAILED DESCRIPTION

Figure 1:
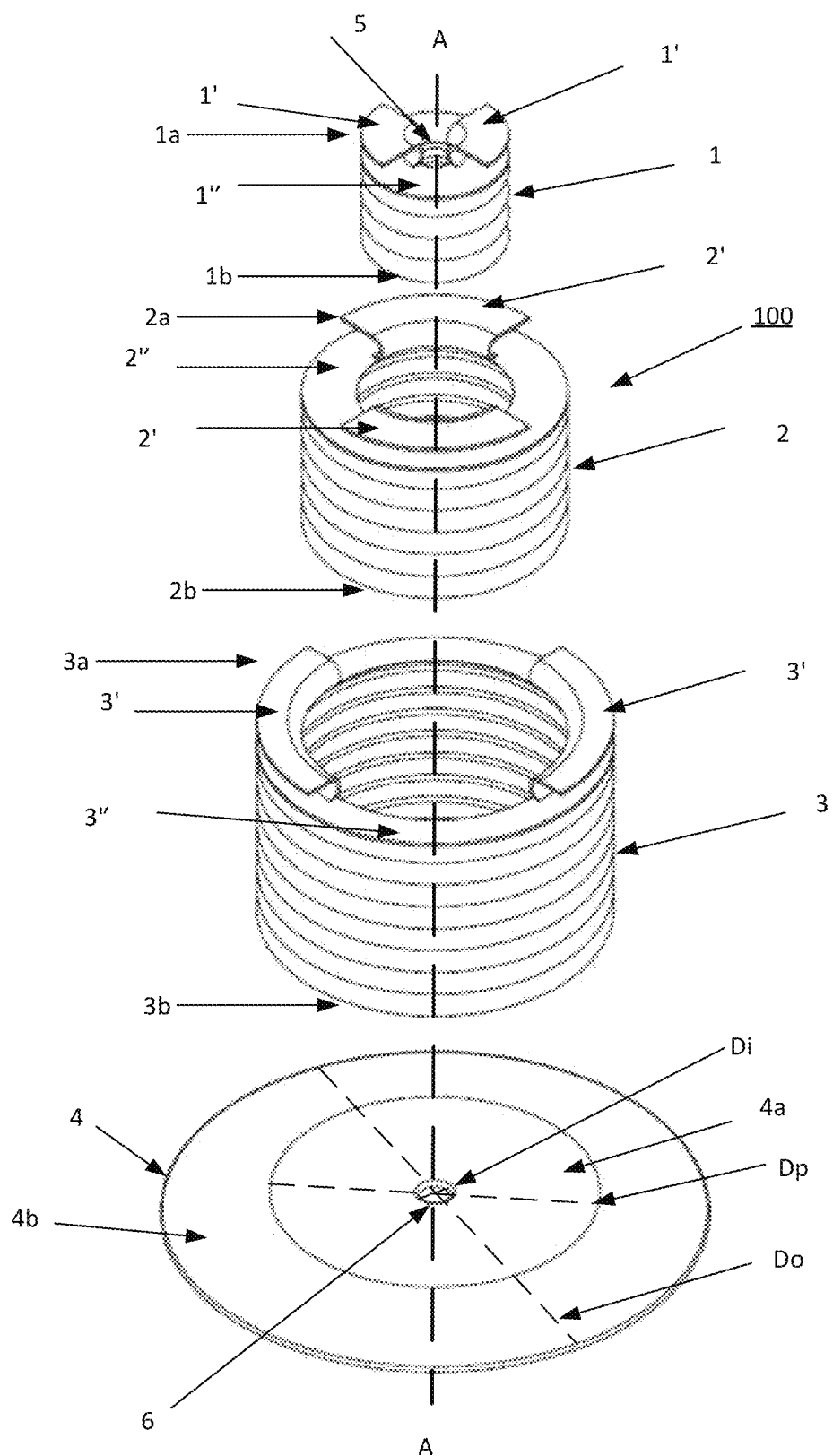
FIG. 1 is an expanded isometric view of an embodiment of an energy absorber or damper, in accordance with an aspect of the present disclosure.

FIG. 1 shows an embodiment of an energy absorber or "damper" 100, which may be coupled to a body part protector, such as a helmet (e.g., helmet 400, FIG. 4A) in a head protection system (e.g., system 101, FIG. 4A), to protect a human body part (e.g., a head of a human user) as described in greater detail below. When such a body protector (e.g., helmet) is placed on a body part (e.g., head 103, FIG. 4C) and worn by a user, the user's body part (e.g., head) is at least partially isolated from the body protector (e.g., helmet) by the dampers 100, which are interposed between the body part (e.g., head) and the body part protector (e.g., helmet). As described in greater detail below, compression of the dampers 100 helps to decelerate the body part (e.g., head) during an impact, resulting in a reduction of the impact force and energy transmitted to the body part (e.g., head).

Figure 2:
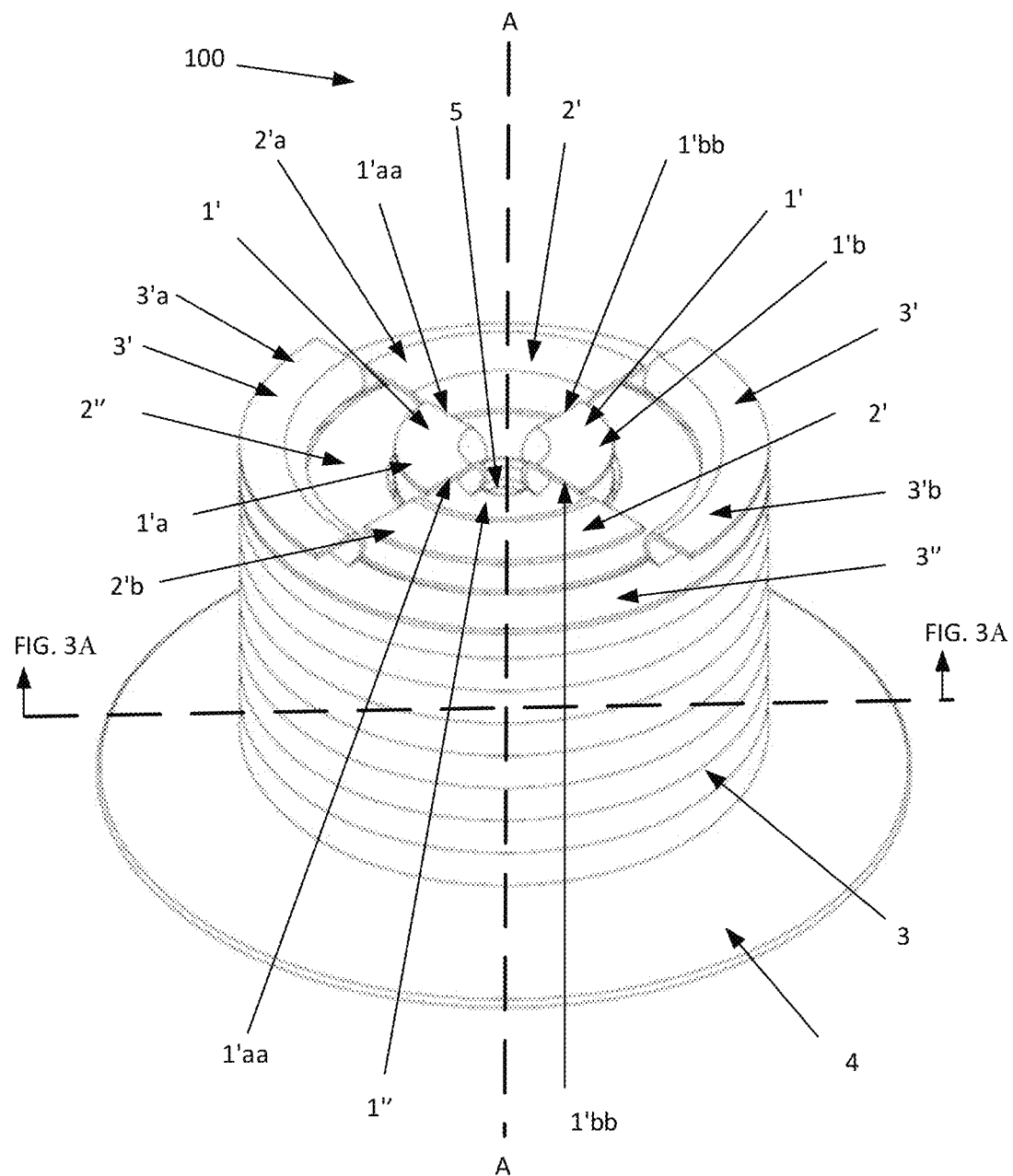
FIG. 2 is an unexpanded isometric view of the damper of FIG. 1.

As shown in FIGS. 1 and 2, the damper 100 includes a plurality of concentrically arranged resilient damper elements 1, 2, and 3 arranged in a nested configuration. For example, as shown in FIG. 1, an inner damping element 1 is concentrically positioned within a middle damping element 2, which is concentrically positioned within an outer damping element 3. The outer damper element 3 has an upper end 3a and a lower end 3b. The middle damper element 2 has an upper end 2a and a lower end 2b. The inner damper element 1 has an upper end 1a and a lower end 1b. A body part engagement member 4 (hereinafter referred to as a "head stabilizer" in the example of a head protector or helmet) is attached to the lower end 3b of the outer damper element 3. The body part engagement member 4 (head stabilizer) is configured to engage the body part (e.g., head 103, FIG. 4C) of a wearer of the body part protector (e.g., helmet 400 of FIG. 4), as will be described in further detail below.

In the example embodiment the damper elements 1, 2, and 3 are all made of one piece and are made from one material, such as silicone rubber, D3O® impact absorbing material, PORON® plastic material, ARMOURGEL™ energy absorbing material or some other suitable material. The density of the damping elements 1, 2, and 3, and head stabilizer 4 may be the same or may be different.

In FIG. 2 the damper 100 is shown in a neutral, uncompressed state. The damper 100 is configured for longitudinal compression and expansion along axis A-A in response to translational impact force application to and removal from the damper 100. The damper 100 is flexible and resilient and is configured to return to the neutral state when external impact forces are no longer applied to the damper 100. In the example embodiment shown in FIG. 2, the lengths of the damper elements 1, 2, and 3, as measured in their neutral state, are different from one another so that the bottom ends 1b, 2b, and 3b of each respective damping element 1, 2, and 3 are longitudinally spaced from each other. Specifically, in the example shown, the length of the damper elements 1, 2, and 3 increases with increasing radial distance away from the axis A-A such that the inner damper element 1 has a first length, the middle damper element 2 has a second length larger than the first length, and the outer damper element 3 has a third length that is larger than both the first and second lengths. The vertical spacing of the bottom ends 1b, 2b, and 3b of the damper elements 1, 2, and 3, provides for various combinations of springs to be compressed based on the magnitude of impact force applied to the damper 100, further details of which will be described in detail below.

Also, the damper 100 is configured for some amount of lateral deflection or swinging motion about axis A-A from the neutral state in response to rotational impact force application to the damper 100. For example, the damper 100 shown in FIG. 4B may deflect in an arc (shown by arrow B) about its point(s) of connection (e.g., between the inside surface of the helmet 400 and lower lips 1", 2", and 3", discussed below) with the helmet 400. The damper 100 is resilient and is configured to return to the neutral state when external impact forces are no longer applied to the damper 100. In the example embodiment shown in FIG. 2, the elements 1, 2, and 3 are radially spaced from one another, with the outer damper element 3 having the largest diameter and the inner damper element 1 having the smallest diameter. The radial spacing of the damper elements 1, 2, and 3 provides the damper 100 with some rigidity to resist lateral deflection and prevent kinking of the damper elements 1, 2, and 3. Specifically, when the damper is progressively compressed from the neutral position, the head stabilizer 4 will successively engage the middle damper element 2 and then the inner damper element 1. When the middle damper element 2 is engaged, the area moment of inertia of the damper 100 is effectively increased as compared to the stiffness of the outer damper element 3 alone. Also, when the inner damper element 1 is engaged along with the middle damper element 2 and the outer damper element 3, the area moment of inertia of the damper 100 is effectively further increased. Thus, in other words, the multiple annular damper elements 1, 2, and 3 can, in combination, increase the flexural rigidity of the damper 100 so that it will laterally deflect less under the same bending moment.

As shown in FIG. 2, each damper element 1, 2, and 3 includes a corresponding upper lip 1', 2', and 3' and lower lip 1", 2", and 3" that are joined together at a radially inner curved wall 1''', 2''', and 3'''. One or more of the upper lip 1', 2', and 3', corresponding lower lip 1", 2", and 3", and corresponding curved wall 1''', 2''', and 3''' may be adhered, fused, or otherwise coupled to the outer shell 401 of the helmet 400 (FIG. 4B) or to a liner 502 (FIGS. 5A, 5B) on the inside of the outer shell of the helmet. Alternatively, where the damper 100 is adhered to the inside surface of the helmet 400 the damper 100 may be formed without upper lips 1', 2', and 3' and without inner curved walls 1''', 2''', and 3'''. In such a case, lower lips 1", 2", and 3" are formed for attachment (i.e., adhesive attachment) to the inside surface of the outer shell 401 of the helmet 400 or to a liner (e.g., liner 402) inside the shell.

In the specific embodiment shown in FIG. 2, each of the lower lips 1", 2" and 3" is formed as an annulus while corresponding upper lips 1', 2', and 3' are formed as arcuate annular segments spaced vertically above their corresponding lower lips 1", 2" and 3". For example, upper lip 1' includes a pair of diametrically opposed upper lip segments 1'*a* and 1'*b*. The upper lip segments 1'*a* and 1'*b* are longitudinally spaced along axis A-A from annular lower lip 1" by curved wall 1'''. As shown in FIG. 2, the middle damper element 2 and outer damper element 3 may have the same construction of the upper and lower lips as damper element 1. The upper lip 1', lower lip 1", and curved wall 1''' define a set of circumferential groove segments which may be configured to receive and seat in corresponding arcuate slots (not shown) in an outer shell (e.g., shell 401) of a helmet (e.g., helmet 400). Such a mechanical fastening may be used alone or additionally with adhesive to couple the damper 100 to the helmet. Also, the lower lips 1", 2", and 3" may be adhered or attached to an inner side of an outer shell (e.g., outer shell 401, FIG. 4B) of a helmet (e.g., helmet 400, FIG. 4B) or to an inner liner (e.g., liner 502, FIG. 5A) of a helmet (e.g., helmet 500, FIG. 5A).

The upper lip segments of each upper lip 1', 2', and 3' are circumferentially spaced ninety degrees from one another so that each upper lip segment covers one quarter of the area of their corresponding lower lip. For example, as shown in FIG. 2 the angle subtended by side edges 1'*aa* of upper lip 1'*a* is about ninety degrees and the angle subtended by side edges 1'*bb* of upper lip 1'*b* is about ninety degrees. As shown in FIG. 2, the middle damper element 2 and outer damper element 3 may have the same construction of their upper and lower lips as damper element 1.

Also, the upper lip segments of each damper element 1, 2, 3, are oriented ninety degrees about the axis A-A with respect to the upper lip segments of other damper elements. For example, the upper lip 2' of the middle damper element 2 includes lip segments 2'*a* and 2'*b* which are oriented so that they are rotated ninety degrees with respect to lip segments 1'*a* and 1'*b*. Also, the upper lip 3' of the outer element 3 includes lip segments 3'*a* and 3'*b* are rotated ninety degrees with respect to lip segments 2'*a* and 2'*b*.

Figure 3A:
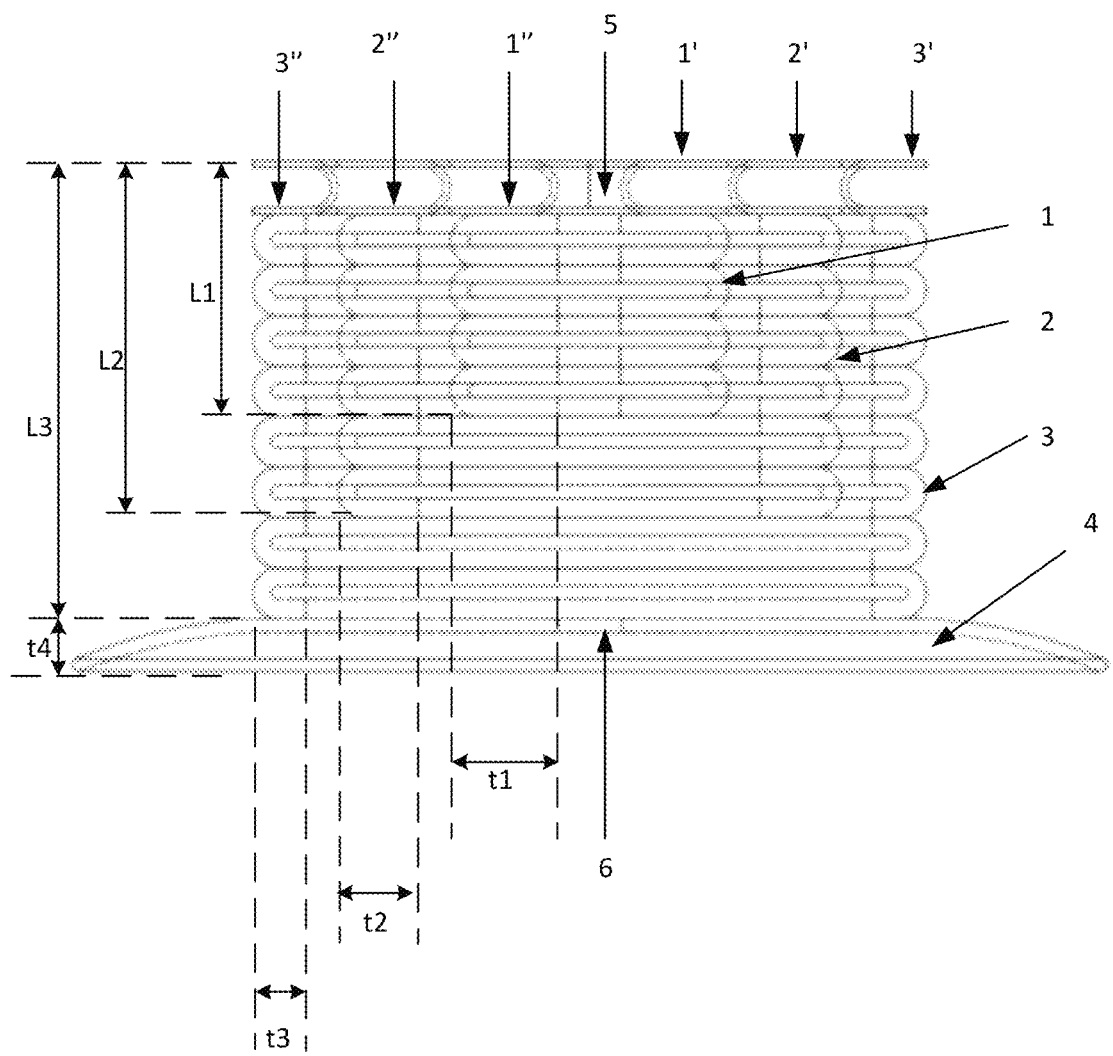
FIG. 3A is a view of the damper of FIG. 2 along section 3A-3A in FIG. 2.

As shown in the example in FIG. 3A, the damper elements 1, 2, and 3 have a convoluted or pleated wall, which is compressible and resilient, as noted above. The amount of compressibility (or stiffness) exhibited by each damper element 1, 2, and 3 may be based on the thickness of the wall of the respective damper element, the number of damper convolutions, and the material properties (e.g., density) of the damper element. The differences in stiffness among the damper elements and their longitudinally spaced relationship allows for different levels of resistance to impact forces to be progressively activated based upon the magnitude of the impact force.

The convoluted wall resembles a tubular bellows. In the example shown in FIG. 3A, the inner damper element 1 has four convolutions, the middle damping element 2 has six convolutions, and the outer damping element 3 has eight convolutions. The outer and inner diameters of inner damper element 1 are about 20.67 mm and 4.67 mm respectively, the outer and inner diameters of inner damper element 2 are about 37.33 mm and 25.33 mm respectively, and the outer and inner diameters of outer damper element 3 are about 50.0 mm and 42.0 mm respectively. Thus, in the example, a wall thickness t1 of the inner damper element 1 is about 8 mm, a wall thickness t2 of the middle damper element 2 is about 6 mm, and a wall thickness t3 of the outer damper element 3 is about 4 mm. Accordingly, in the example, the ratio of wall thicknesses t1:t2:t3 is: 8:6:4 (or 4:3:2). Also, with regard to the example, in the neutral state of the damper shown in FIG. 2, the length L3 of outer damper element 3 is about 30 mm+/−5 mm, the length L2 of middle damper element 2 is about 22.5 mm+/−5 mm, and the length L1 of inner damper element 1 is about 15 mm+/−5 mm. Therefore, as you progress from the outer damper element 3 to the inner damper element 1 there is an increase in the wall thickness of each damper element, a decrease in height, and an increase in longitudinal and lateral stiffness.

Figure 3B:
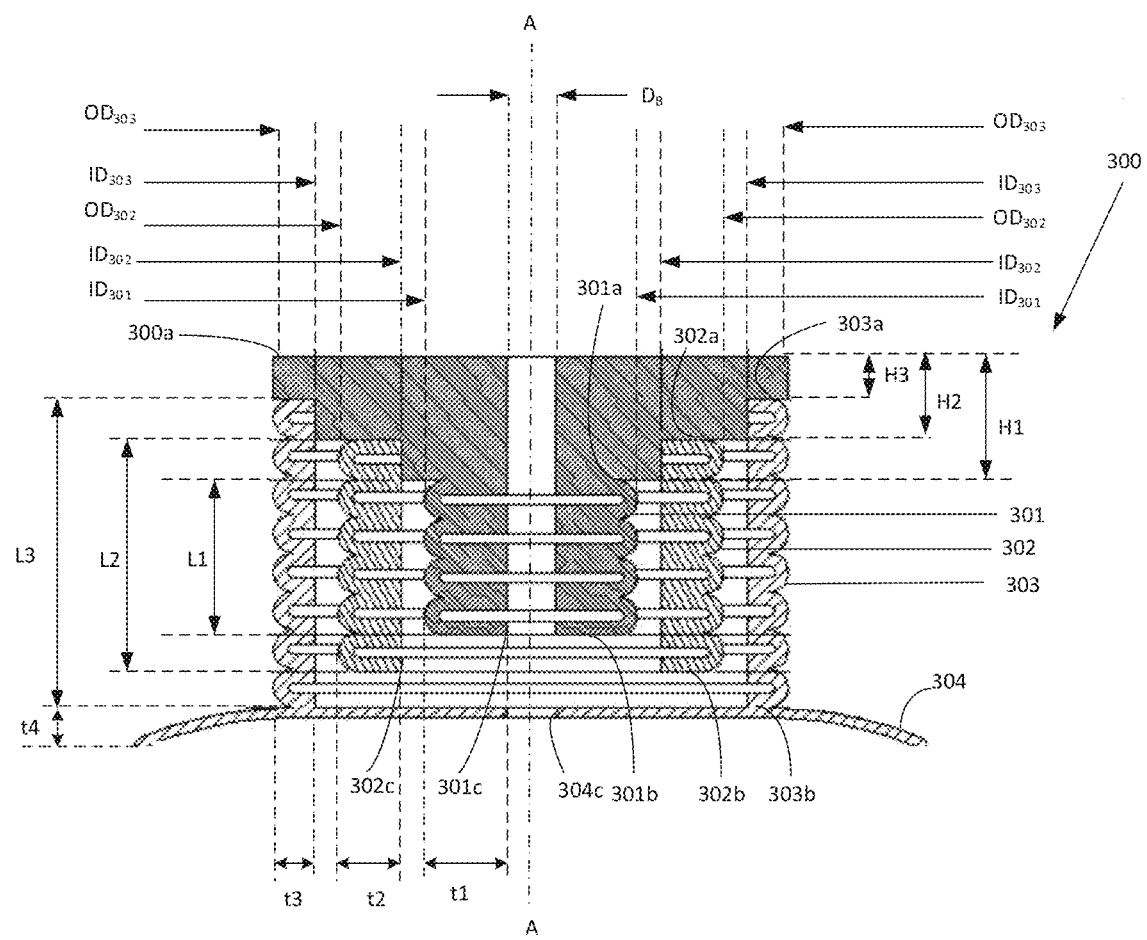
FIG. 3B is a view of an alternate damper to that shown in FIG. 3A.

FIG. 3B shows an alternative embodiment of the damper shown in FIG. 3A. In FIG. 3B, like elements to those in FIG. 3A are incremented by "300". Thus, the damper shown in FIG. 3B includes inner damper element 301, outer damper element 303, and middle damper element 302. The damper 300 extends longitudinally along the central axis A-A. The inner damper element 301 defines a central longitudinal hole centered about axis A-A that longitudinally aligns with a central hole formed in the head stabilizer 304 and which extends through to the outer end 300*a* of the damper. One of the differences between damper 300 and damper 100 is that outer ends 301*a*, 302*a*, and 303*a* of the damper elements 301, 302, and 303 are longitudinally staggered or stepped from one another along axis A-A. Specifically, the distance between the outer end 300*a* of the damper 300 and the outer ends 301*a*, 302*a*, 303*a* of each respective damper element 301, 302, and 303 decreases with increasing distance (radial distance) from axis A-A. The inner damper element 301 has its outer end 301*a* spaced longitudinally from the outer end 300*a* of the damper 300 by a distance H1, the middle damper element 302 has its outer end 302*a* spaced longitudinally from the outer end 300*a* of the damper 300 by distance H2, and the outer damper element 303 has its outer end 303a spaced longitudinally from the outer end 300a of damper 300 by distance H3. As shown in FIG. 3B, the distance H1 is greater than H2, which is greater than H3.

Though not shown in FIG. 3B, the damper 300 may optionally include the upper and lower lips shown in FIG. 3A for connection of the damper 300 to other parts (e.g., outer shell) of a helmet. Alternatively, the damper 300 may connect to other parts (e.g., outer shell) of a helmet without those upper and lower lips, such as with an adhesive applied between the helmet (e.g., outer shell) and the outer end 300a of the damper 300.

In the embodiment shown in FIG. 3B, the radial thicknesses t1, t2, and t3 of the elements 301, 302, and 303 decreases with increasing radial distance away from axis A-A. Thus, the thickness t3 of the outer damper element 303 is less than thickness t2 of the middle damper element 302, which is less than the thickness t1 of the inner damper element 301. In at least one other embodiment, the radial thicknesses t1, t2, and t3 may be equal or may vary in other ways other than that described for damper 300. For example, in one embodiment, the thicknesses t1, t2, and t3 may increase with increasing radial distance away from axis A-A.

In at least one alternate embodiment to that shown in FIG. 3B, the distance between the outer end 300a of the damper 300 and the outer ends 301a, 302a, 303a of each respective damper element 301, 302, and 303 increases with increasing distance (radial distance) from axis A-A. Thus, in such an embodiment, H3 is greater than H2, and H2 is greater than H1. In other embodiments, H1, H2, and H3 can vary in other ways. For example, H2 may be larger or less than than both H1 and H3.

Figure 3C:
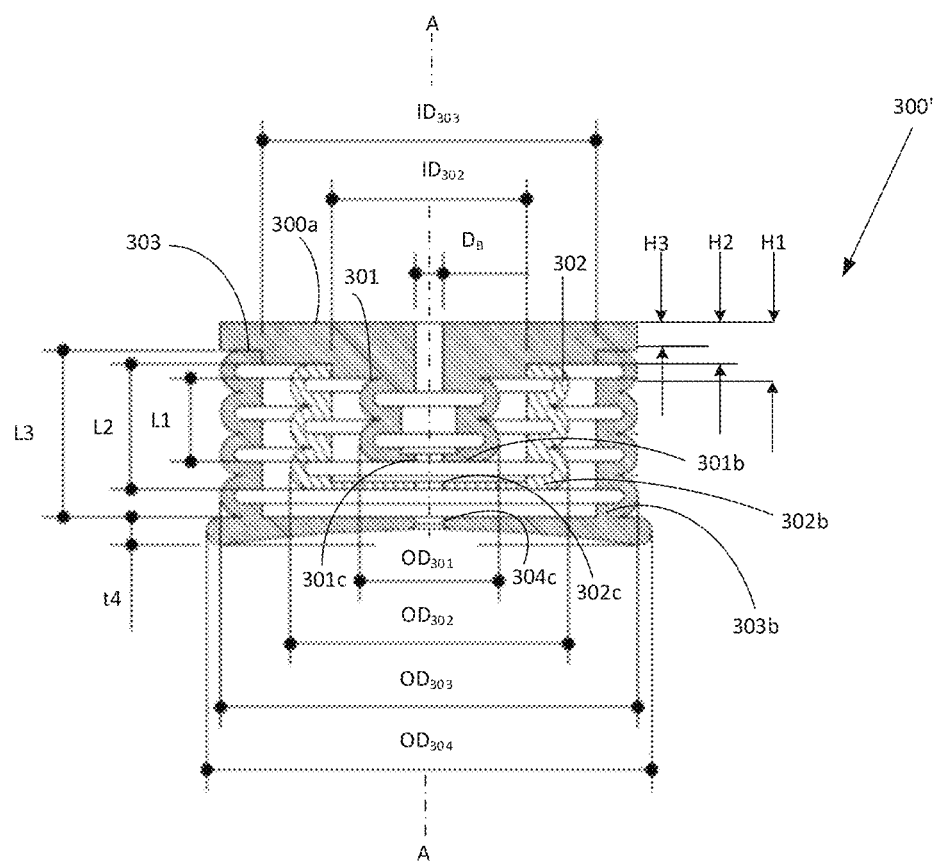
FIG. 3C is a view of an alternate damper to that shown in FIG. 3B.

FIG. 3C shows an alternate embodiment of the damper 300, denoted 300'. In FIG. 3C, the radial thickness t1, t2, and t3 of damper elements 301, 302, and 303, are equal to each other. For example, the thicknesses t1, t2, and t3 may be 2 mm. Also, as shown in FIG. 3C, an inner end 302b of damper element 302 is partially closed and extends horizontally, similar to the head stabilizer 304, which extends horizontally across the inner end 303b of the damper element 303. In the example embodiment, the partially closed inner end 302b defines a ventilation hole 302c having a diameter $D_B$ equal to the diameters of ventilation holes 301c and 304c and equal to a hole in the outer end 300a of the damper 300'. Thus, in at least one embodiment, the partially closed inner end 302b may partially cover an inner end 301b of damper element 301, and, thus, substantially (with the exception of a ventilation hole 302c formed in the inner end 302b of the damper element 302) longitudinally and radially surrounds the damper element 301. Also, while the head stabilizer 304 is shown having ventilation hole 304c, it will be appreciated that the horizontally extending portion of the head stabilizer 304 connected to the inner end 303b of the damper element 303 may be considered to be part of the damper element 303 such that ventilation hole 304c may be a feature of the inner end 303b of the damper element 303.

In damper 300', the outer diameter $OD_{301}$ of the damper element 301 may be about 10 mm, the outer diameter $OD_{302}$ of damper element 302 may be about 20 mm, the outer diameter $OD_{303}$ of damper element 303 may be about 30 mm, the inner diameter $ID_{302}$ of damper element 302 may be about 14 mm, the inner diameter $ID_{303}$ of damper element 303 may be about 24 mm, and the outer diameter $OD_{304}$ of head stabilizer 304 may be about 32 mm. In damper 300', L1 may be about 6 mm, L2 may be about 9 mm, L3 may be about 12 mm, H1 may be about 4 mm, H2 may be about 3 mm, and H3 may be about 2 mm. Also, in damper 300', the diameter $D_B$ of the aligned ventilation openings 301c, 302c, 304c along axis A-A may be about 2 mm. Also, the thickness t4 of the head stabilizer 304 may be about 2 mm.

Turning back to FIG. 1, the head stabilizer 4 has a generally planar circular inner portion 4a centered about axis A-A and a generally concave outer portion 4b concentrically surrounding the inner portion 4a. The inner portion 4a of the head stabilizer 4 defines a central hole 6. In one example, a diameter $D_i$ of the hole 6 is about 4.67 mm, an outer diameter $D_p$ of the inner planar portion 4a is about 46.84, and an outer diameter $D_o$ of the outer concave portion 4b is about 76.84 mm. As shown in FIG. 3A, the hole 6 aligns with hole 5 (which also has a diameter of about 4.67 mm) along axis A-A.

Figure 4A:
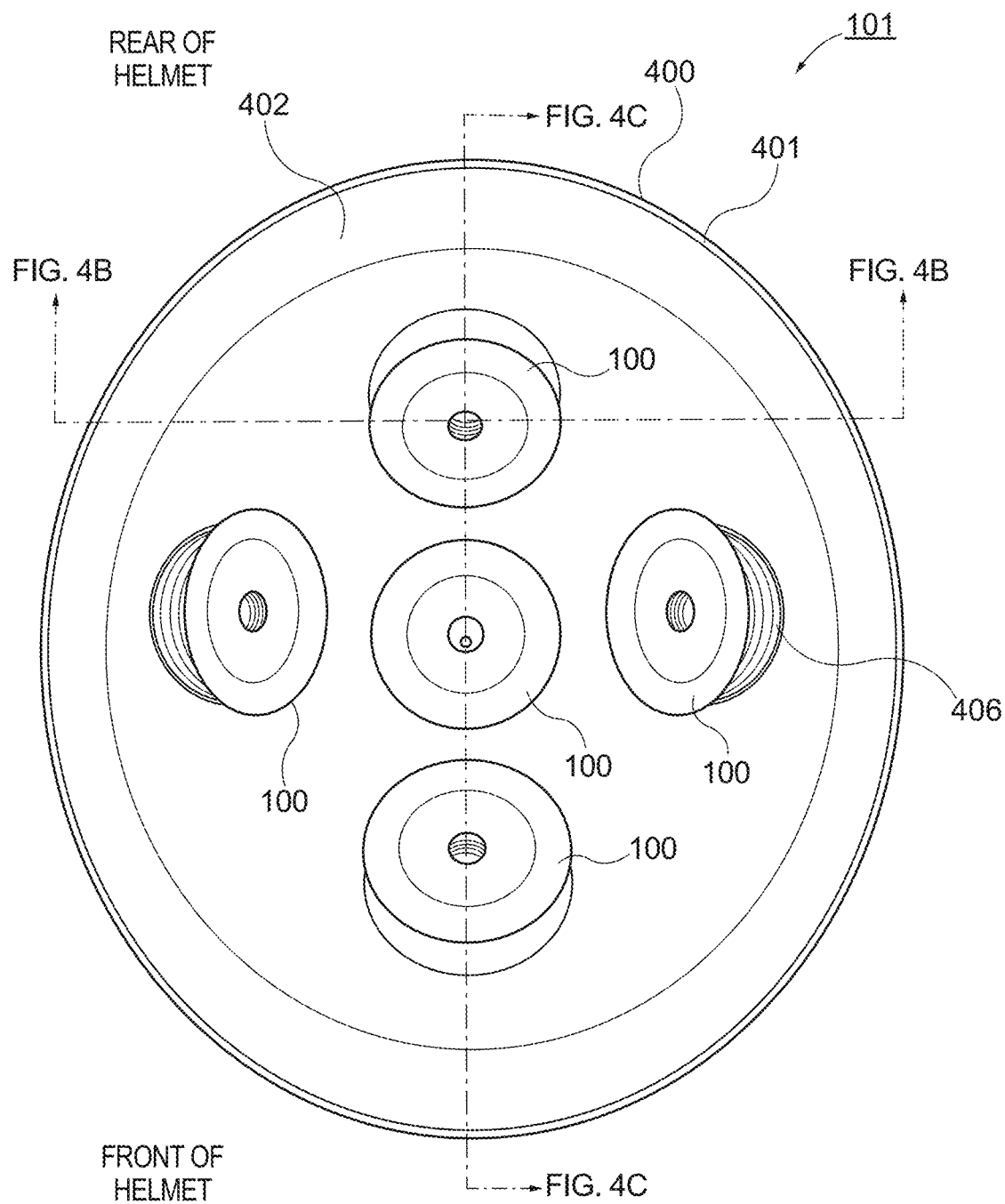
FIG. 4A is a view of an inner side of a helmet in which a plurality of dampers of FIGS. 1 and 2 are incorporated, in accordance with an aspect of the present disclosure.

FIG. 4A illustrates the aforementioned head protection system 101 that includes the helmet 400 and at least one damper 100 that is coupled to the helmet 400. For example, in the embodiment shown in FIG. 4A, a plurality of five dampers 100 are coupled to the helmet 400 and extend inwardly along a longitudinal direction from a first end attached to the helmet to a free end at the head stabilizer 4. The dampers 100 shown in FIG. 4A are distributed in an "X" pattern as follows: one damper located at the center (corresponding to the location of the crown of the head of a wearer of the helmet), one damper at a front position, one damper at a right position, one damper at a left position, and one damper at a rear position. The helmet 400 may include a hard outer shell 401 and one or more liners 402 (e.g., a compressible foam liner) coupled to the inner side of the outer shell 401. For example, for helmet 400 the outer shell 401 may be made from a thin outer polyvinyl chloride (PVC) or fiberglass and/or carbon and the liner 402 may be made from expanded polystyrene (EPS) or ethylene-vinyl acetate (EVA) in-molded to the PVC shell. The helmet 400 may have a comfort liner 402a (not shown in FIG. 4A, but shown in FIGS. 4B and 4C) on an inner side of the liner 402 and may be made from ethylene-vinyl acetate (EVA) or some other suitable material for comfort. When the helmet 400 is worn by a user, as shown in FIG. 4C, for example, the inner concave side of the head stabilizer 4 is configured to engage a head 103 of a user.

Figure 4B:
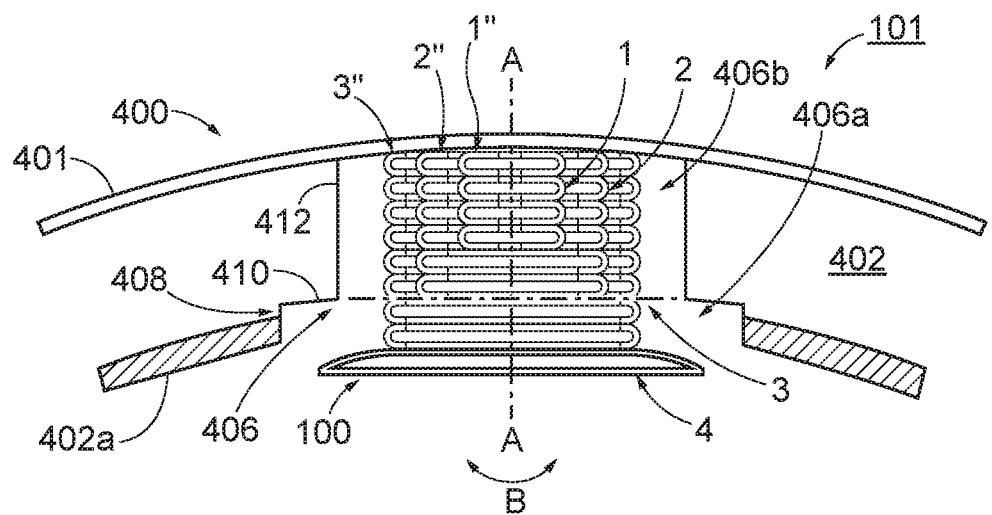
FIG. 4B is a view of the helmet and dampers of FIG. 4A along section 4B-4B in FIG. 4A.

FIG. 4B shows a view of the system 101 along section 4B-4B in FIG. 4A. An opening 406 is formed in the liner 402 and comfort liner 402a in which the damper 100 is disposed. The damper 100 extends concentrically within the opening 406 along longitudinal axis A-A. Specifically, the lower lips 1", 2", and 3" of the damper elements 1, 2, and 3, are attached (e.g., adhesively) to an inner surface of the outer shell 401. In the neutral state shown in FIGS. 4A and 4B, the head stabilizer 4 extends just below and in spaced relation to a comfort liner 402a.

The stepped opening 406 shown in FIG. 4B is defined by a first tapered portion 406a and a second cylindrical portion 406b. The first portion 406a is defined by a frustoconical surface 408 having a first diameter at the inner side 402a of the liner 402 and having a second, smaller diameter, at an annular shoulder 410. The first diameter is larger than the diameter of the head stabilizer 4. The annular shoulder 410 extends radially inwardly from the frustoconical surface 408 to a cylindrical surface 412 of the second portion 406b of the opening 406. The cylindrical surface 412 extends longitudinally along axis A-A from the annular shoulder 410 to the outer shell 401. The diameter of the cylindrical surface 412 is less than the second diameter of the frustoconical surface 408. The length of the second portion 406b, measured longitudinally along axis A-A, from the outer shell 401 is about the same as the length L2 of the middle damper element 2.

Figure 4C:
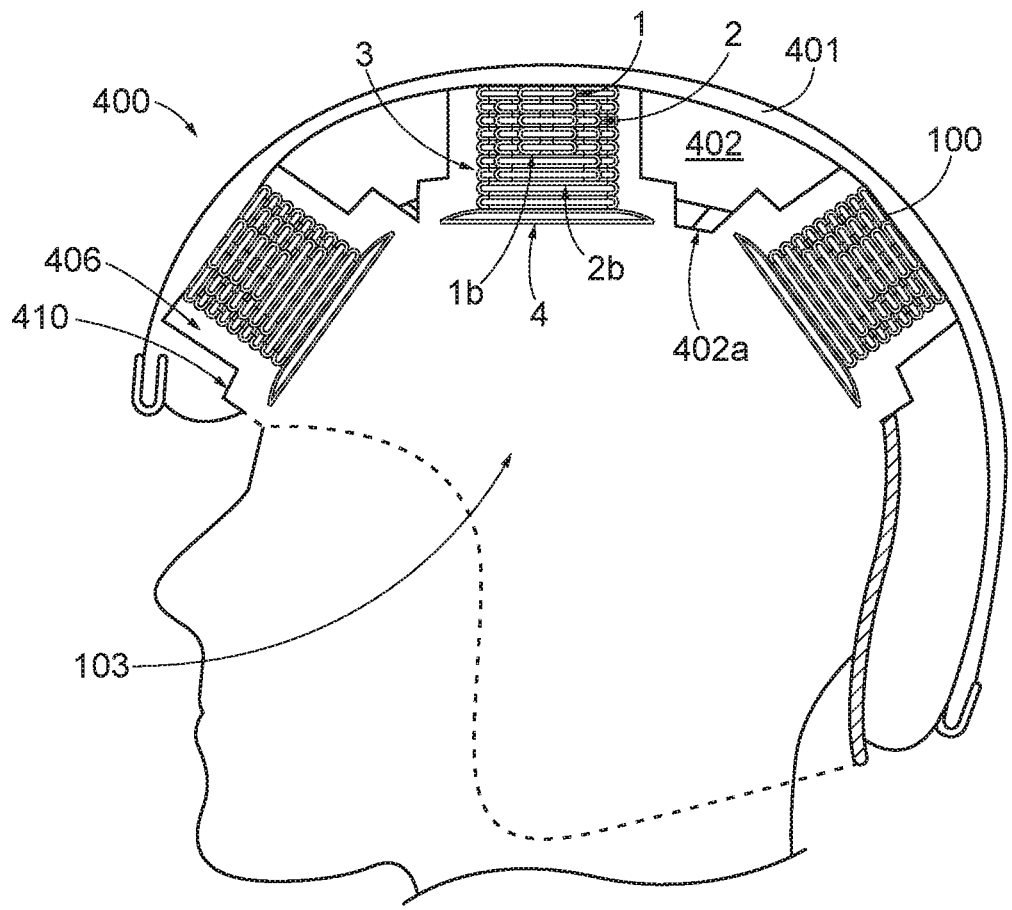
FIG. 4C is a view of the helmet and dampers of FIG. 4A along section 4C-4C in FIG. 4A when worn by a user.

As shown in FIG. 4C, when the helmet 400 is placed on the head 103 of a wearer and the head stabilizers 4 are engaged with the head 103, the outer damper 3 will be partially compressed, and the head stabilizer 4 will engage (and possibly slightly compress) the middle damper element 2, while remaining spaced from the shoulder 410. Since the head stabilizer 4 is engaged with the middle damper element 2 when the helmet is placed on the head 103, the area moment of inertia of the damper 100 is automatically increased as compared to when the helmet 400 is not worn on the head (e.g., FIG. 4A). As a result, when the helmet 400 is placed on the head 103, the damper 100 is initially laterally and longitudinally stiffened and may become even stiffer when the head stabilizer 4 engages inner damper element 1 as described above.

In an impact between the helmet 400 and an object the user's head 103 will move with the head stabilizers 4 relative to the outer shell 401 of the helmet 400, causing corresponding longitudinal and/or lateral movement of the head stabilizer 4 and compression and/or flexure of the damper 100. Due to the direct connection of the head stabilizer 4 to the outer damper element 3 and the vertical spacing between the ends 1b, 2b, and 3b of the damper elements 1, 2, and 3, the damper elements 1, 2, and 3 compress sequentially as described above. Depending on the magnitude of the impact forces (translational and rotational) and the stiffness of the damper elements 1, 2, and 3, two (outer and middle damper elements 3 and 2) or all of the damper elements 1, 2, and 3 may longitudinally compress and/or flex laterally.

For example, initially when the helmet is on the head 103, if the head stabilizer 4 is longitudinally deflected in response to a sufficiently large impact force, the head stabilizer 4 will apply forces to the liner 402 at the shoulder 410, as well as the outer and middle damper element 3 and 2. Specifically, initially following an impact, the outer damper element 3 and the middle damper element 2 distribute the impact force according to their respective stiffnesses such that both the outer damper element 3 and the middle damper element 2 will deflect together the same amount with the head stabilizer 4. Moreover, when the head 103 is engaged with the head stabilizer 4, as shown in FIG. 4C, translational and rotational impact forces will cause the damper 100 to initially bend (transverse to axis A-A) owing to relative translational movement between the outer shell 401 of the helmet 400 and the head stabilizer 4.

Initially following the impact, the translational and rotational impact forces will cause the outer damper element 3 and the middle damper element 2 to compress based on their respective stiffnesses and will flex laterally based on the thickness, number of convolutions, and radial spacing between damper elements 1, 2, and 3. It will be appreciated that the head 103 extends beyond the outer diameter $D_o$ of the head stabilizer 4 and engages the inner surface of the comfort liner 402a around the bore 406 when the helmet 4 is worn. Therefore, whenever the damper 100 compresses from the position shown in FIG. 4C, the comfort liner 402a and the liner 402 will also tend to absorb some of the force of the impact due to engagement of the head 103 with the liners 402a and 402, and, therefore, the liners 402a and 402 will also distribute some of the impact force in parallel with the damper 100.

If the magnitude of the impact forces are large enough, the head stabilizer 4 may compress the outer damper element 3 and middle damper element 2 and move longitudinally along axis A-A to engage and compress the liner 402 at the shoulder 410, and. When the liner 402, and the middle and outer damper elements 2 and 3 are compressed, their combination effectively increases the stiffness of the damper 100, and, therefore, the damper will experience a decrease in longitudinal deflection when exposed to the same forces. Also, when the liner 402, and the outer and middle damper elements 3 and 2 are engaged with the head stabilizer 4, the damper 100 exhibits an increased lateral stiffness and, therefore, will experience a decrease in lateral deflection if exposed to the same lateral forces. If the magnitude of the rotational and translational impact forces are large enough, the head stabilizer 4 may continue moving towards and engage the lower end 1b of the inner damper element 1, so that all of the damper elements 1, 2, and 3 and the liner 402 are compressed by the head stabilizer 4 to absorb the energy of the impact and decelerate the head relative to the helmet 400. When the combination of the damper elements 1, 2, and 3 and liner 402 are compressed, the combination will compress, but with a further increase in stiffness of the damper 100 and a further decrease in the amount of deflection as compared to when only the middle and outer damper elements 2 and 3 are engaged. Also, when all of the damper elements 1, 2, and 3 are engaged and compressed, the damper 100 exhibits a further decrease in lateral movement as compared to when only damper elements 2 and 3 are engaged.

The compression of the liner 402 and the damper elements 1, 2, and 3 results in the absorption of energy as a result of the damper elements performing work (Work=Force×distance). The energy absorbed reduces the transmission of the impact force to the user's head, thereby assisting in reducing the severity of the impact to the wearer's head. In one embodiment, the outer damper element 3 is configured to absorb impacts up to 100 g's, the outer damper element 3 and middle damper elements 2 are designed to take impacts up to 200 g's. The combination of all three damper elements 1, 2, and 3 are designed to absorb impacts up to about 250 g's+/−50 g's.

The system 101 of FIG. 4A was comparatively tested against skiing and bicycle helmets. The parameters of the test include a 100 cm drop height and an impact speed of about 4.5 m/sec (15.7 km/hr). One bicycle helmet ("*Bicycle 2 helmet in Table 1, below) that was tested was designed to address rotational acceleration/deceleration impacts. The comparative data is shown below in Table 1.

TABLE 1

| | Type of Helmet | | | | |
|---|---|---|---|---|---|
| | Helmet 1 mass = 675 g | Helmet 2 mass = 670 g | Skiing mass = 600 g | Bicycle 1 mass = 260 g | *Bicycle 2 mass = 300 g |
| Rotational acceleration/deceleration (rad/s$^2$) | 2698 | 2361 | 3508 | 5114 | 4071 |
| Maximum Peak G | 85 | 78 | 90 | 86 | 84 |
| Maximum Angular velocity (rad/s) | 10.6 | 12.4 | 11.9 | 18.3 | 14.4 |

Helmets 1 and 2 were constructed in accordance with the present disclosure. Specifically, both Helmet 1 and Helmet 2 have an outer shell made of fiberglass and carbon, do not include an expanded polystyrene foam liner, include a 10 mm comfort layer made of ethylene-vinyl acetate (EVA), and incorporate five dampers 100 as shown in FIG. 4A adhered to the inner surface of the outer shell. Also, the dampers 100 used in Helmet 1 and Helmet 2 have wall thicknesses having a ratio of 8:6:4, as described above with respect to the example of damper 100. The dampers 100 used were wholly made of silicone rubber having a density of 1.03 g/L. As shown above in Table 1, the tested Helmet 1 and Helmet 2 produces the lowest rotational acceleration and deceleration. The differences in mass listed in Table 1 are due to the presence and number of vent holes in the helmets: Helmet 1 and 2 had no vents, Skiing helmet had a small area of vent openings, and Bicycle 1 and 2 had a relatively larger overall area of vent openings.

Figure 5A:
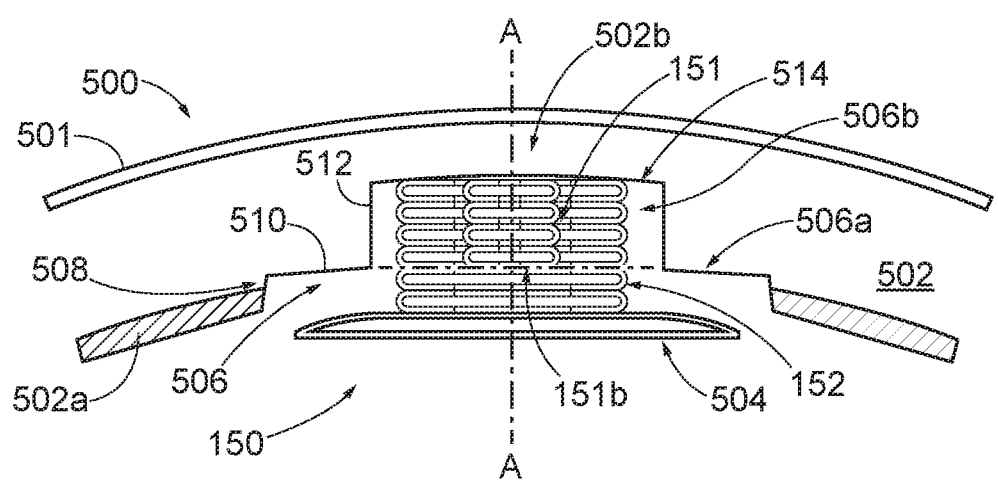
FIG. 5A is a section view of a portion of a helmet and another embodiment of a damper coupled to the helmet.

FIG. 5A illustrates an alternative helmet 500 to helmet 400 in FIGS. 4A to 4C. Specifically, the helmet 500 incorporates a damper 150, which is a modified version of damper 100, which substitutes two damper elements 151 and 152 for the three damper elements 1, 2, and 3 of damper 100. Otherwise, the damper elements 151 and 152 may have the same construction as described above in connection with damper elements 1, 2, and 3. Also, the helmet 500 includes a liner 502, which is similar in construction to that of liner 402, but differing in the construction of opening 406. Specifically, the liner 502 defines a countersunk depression 506 rather than opening 406, such that the damper 150 attaches to the liner 502 rather than to an outer shell 501 of the helmet 500. As shown in FIG. 5A, when the helmet is not placed on the head 103 of a wearer and the stabilizers 504 are disengaged from the head 103, the stabilizer 504 is spaced longitudinally from liner 502a. Also, a compressible portion 502b of the liner 502 is interposed between the damper 150 and the outer shell 501. The portion 502b thus acts as an additional damper element in parallel with the entire damper 150. The depression 506 includes a first portion 506a and a second portion 506b. The first portion 506a is defined by a frustoconical surface 508 having a first diameter at an inner side 502a of the liner 502 and having a second, smaller diameter, at an annular step 510. The annular shoulder 510 extends radially inwardly from the frustoconical surface 508 to a cylindrical surface 512 of the second portion 506b. The cylindrical surface 512 extends from the annular step 510 to a bottom 514 of the depression 506. The diameter of the cylindrical surface 512 is less than the second diameter of the frustoconical surface 508. In the embodiment shown in FIG. 5A, the annular step 510 is aligned with the lower end of the inner damper element 151. When the helmet 500 is placed on the head 103 and the head stabilizer 504 engage the head 103, the stabilizer 504 will compress the outer damper element 152 and engage and/or slightly compress a lower end 151b of the inner damper element 151. The damper elements 151 and 152 will function in similar manner as damper elements 3 and 2 of damper 100, except that the head stabilizer 504 will not engage a third damper element inside damper element 151. Instead, the portion of the liner 502b between the damper 150 and the outer shell 501 is continually used to distribute impact forces in series with the damper 150 and that portion 502b compresses based on the stiffness of the liner material. Thus, during an impact, a portion of the impact force will be transmitted to the liner 502 both at the shoulder 510 and in portion 502b, as well as to the damper 150, which will compress respective amounts based on distribution of the forces therebetween.

Figure 5F:
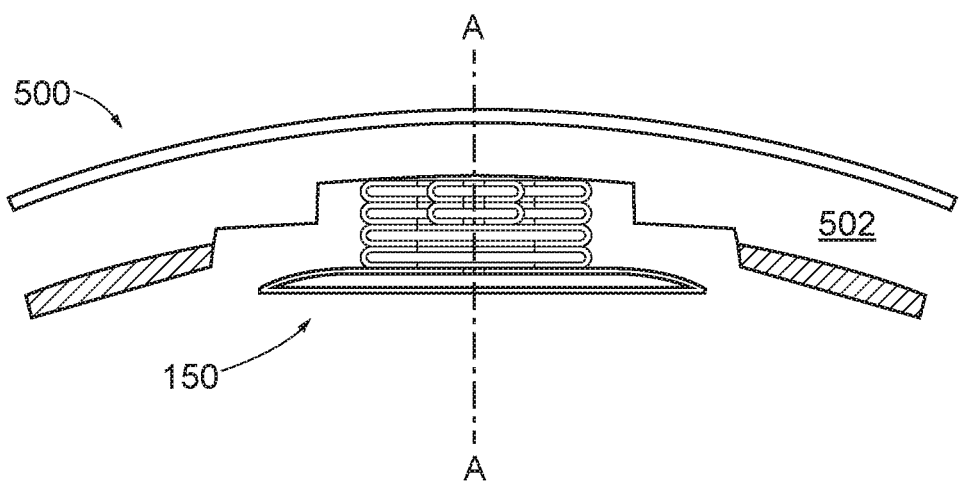
FIG. 5F illustrates the helmet and damper of FIG. 5A with a thinner helmet construction and shorter damper.
Figure 5B:
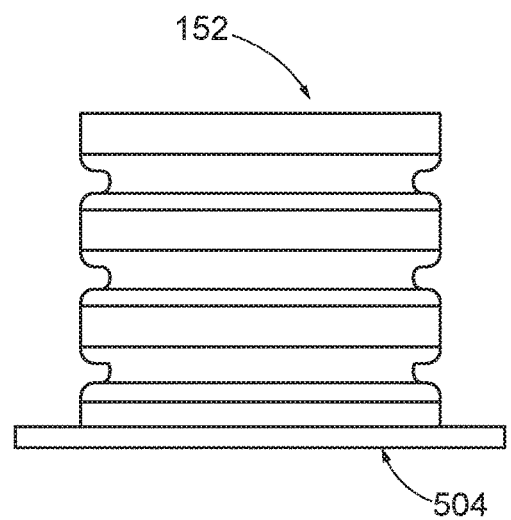
FIG. 5B is a side elevation view of an outer damper element of the damper shown in FIG. 5A.
Figure 5C:
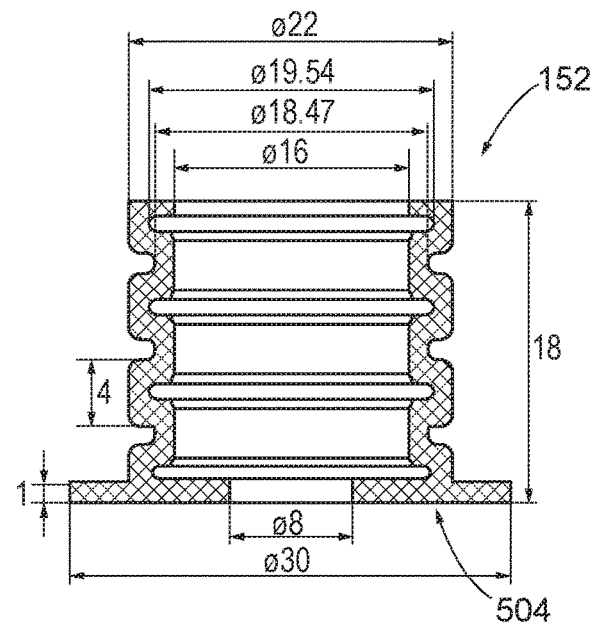
FIG. 5C is a view of the outer damper element of FIG. 5B along a center section thereof.

FIGS. 5B and 5C show details of outer damper element 152. By way of example, the outer damper element 152 may have a convoluted wall having an outer diameter of 22 mm and an inner diameter of 16 mm. The wall of the outer damper may have convolutions that are 4 mm thick. The head stabilizer 504 may have an outer diameter of about 30 mm and an inner diameter of about 8 mm.

Figure 5D:
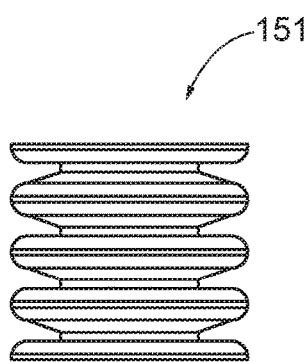
FIG. 5D is a side elevation view of an inner damper element of the damper shown in FIG. 5A.
Figure 5E:
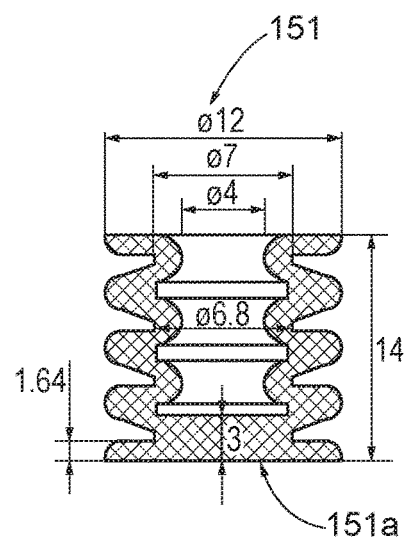
FIG. 5E is a view of the inner damper element of FIG. 5D along a center section thereof.

FIGS. 5D and 5E show details of the inner damper element 151. The inner damper element 151 may have a convoluted wall having an outer diameter of about 12 mm and an inner diameter of about 4 mm. The wall of the inner damper element has convolutions that are about 3.5 mm thick. A lower end 151a of the inner damper element is shown as a solid closed flange having a thickness of about 3 mm. Thus, owing to the dimensions of the inner and outer damper elements 151 and 152 of the example shown in FIGS. 5C and 5E, there is a radial spacing of about 2 mm between the inner and outer damper elements 151 and 152.

FIG. 5F illustrates a lower-profile alternative embodiment to that shown in FIG. 5A in which the liner 502 is thinner (in the axial dimension along axis A-A) than in FIG. 5A and the length of the damper 150 along axis A-A is less than in FIG. 5A.

Figure 6:
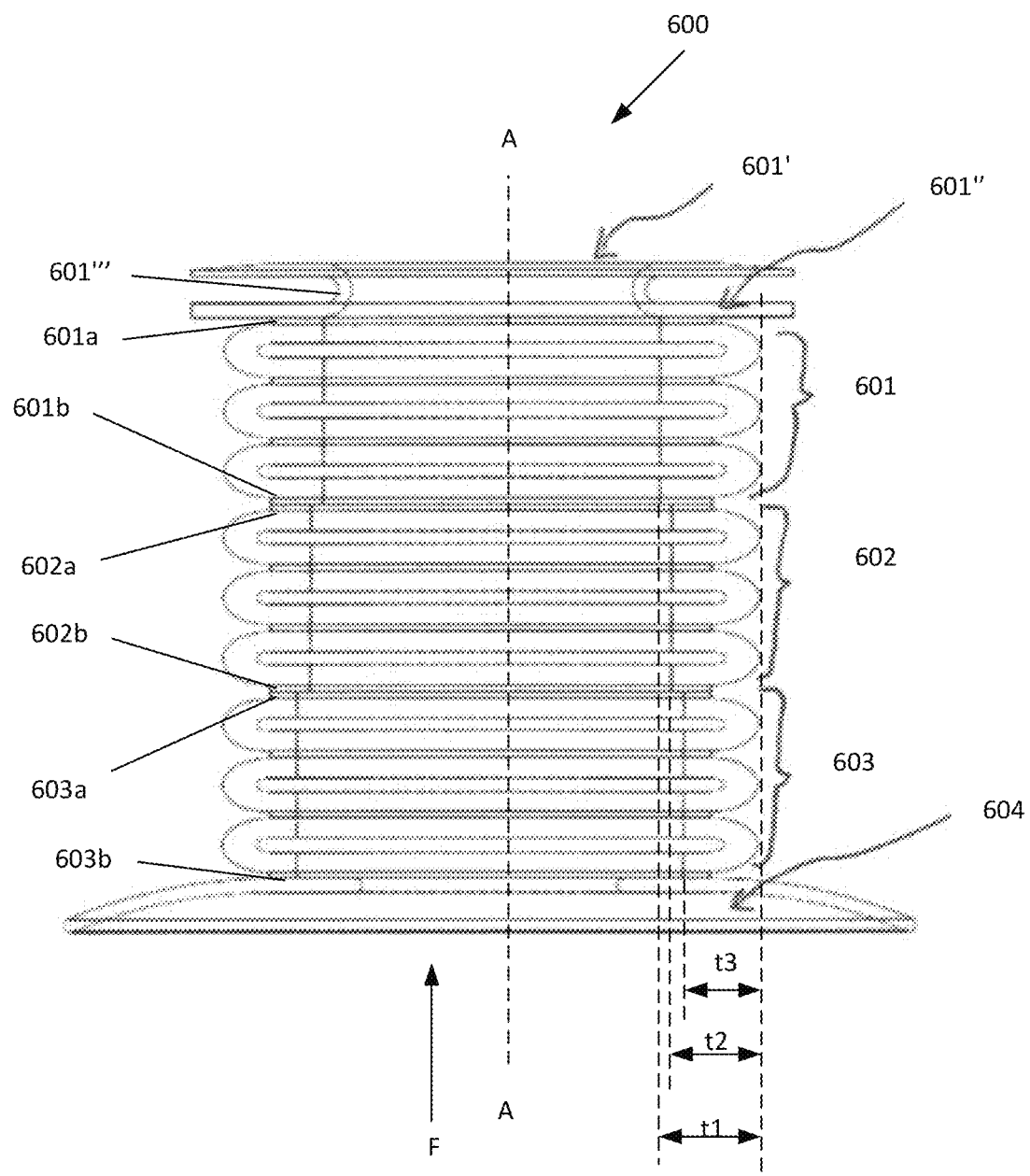
FIG. 6 is a center section view of another embodiment of a damper in accordance with an aspect of the disclosure.

FIG. 6 shows a cross-section of another embodiment of a damper 600, which includes three circular damper elements 601, 602, and 603, and a head stabilizer 604 attached to the damper element 603. The damper elements 601, 602, and 603 are arranged end-to-end in a serial configuration along axis A-A. In FIG. 6 the damper 600 is shown in its neutral (i.e., fully uncompressed) state. In one embodiment, lower damper element 603 is attached to a middle damper element 602, which is attached to upper damper element 601. The damper element 603 has a lower end 603b that is attached to the head stabilizer 604 and has an upper end 603a that is attached to a lower end 602b of the middle damper element 602. The middle damper element 602 has an upper end 602a that is attached to a lower end 601b of the upper damper element 601. The upper damper element 601 has an upper annular lip 601' and a lower annular lip 601" that define an annular groove 601''' at an upper end 601a of the upper damper element 601. The annular groove 601''' may have the same function as the groove described above, i.e. to receive and seat with an outer shell of a helmet, such as shell 401 of helmet 400. It will be appreciated, however, that the outer shell 401 of the helmet 400, for example, may be modified to define a fully circular hole having a diameter that is slightly smaller than the diameter of the annular groove 601''' so that the annular groove is seated in the hole in the shell 401 of the helmet 400. Also, the upper lip 601' may be adhered or otherwise attached to the outer shell or a liner of the helmet in the same manner described above for upper lips 1', 2', and 3' of damper 100.

Each damper element 601, 602, and 603 in FIG. 6 has a convoluted wall with three convolutions per damper element. In the example shown in FIG. 6, the height of all convolutions along axis A-A are the same. Of course, the number of convolutions and the dimensions may be different in other embodiments depending on the materials and/or wall thicknesses of each damper element. The damper elements 601, 602, and 603 and head stabilizer 604, may all be made from the same material, such as silicone rubber. The lower damper element 603 has a wall thickness t3 that is less than a wall thickness t2 of the middle damper element 602. The upper damper element 601 has a wall thickness t1 that is larger than the wall thicknesses t2 and t3. All factors being equal among damper elements 601, 602, and 603, damper elements with a thicker wall are stiffer than damper elements with a thinner wall. Thus, in a case where the damper elements 601, 602, and 603 are made of the same material (e.g., silicone rubber), and the number of convolutions and convolution height are the same (as in the example in FIG. 6), the upper damper element 601 has the largest wall thickness t1 and, therefore, is the stiffest of the damper elements 601, 602, and 603. Also, the lower damper element 603 has the thinnest wall thickness t3 and, therefore, is the least stiff (most compressible) of the damper elements 601, 602, and 603. Thus, all factors being considered equal (except for wall thickness), the stiffness of the damper elements 601, 602, and 603 increases in a direction along axis A-A from the lower damper element 603 to the upper damper element 601. The progression in stiffness of the damper elements 601, 602, and 603 permits the damper to respond with increasing stiffness for larger impact forces, and to gradually decelerate the head of the wearer of a helmet incorporating the damper 600.

The damper elements 601, 602, and 603 are arranged like springs connected in series. An impact force F, applied in the direction of the arrow shown in FIG. 6, will be transmitted to all of the damper elements 601, 602, and 603, which will each compress an amount based on their stiffness. In one embodiment the damper elements 601, 602, and 603 are modeled as Hookean (linear-response springs) arranged in series, where each spring has a respective spring constant, so that the applied force is directly proportional to compression of the spring, as related below:

$$F = F_1 = F_2 = F_3 \quad (1)$$

$$-k_1 x_1 = -k_2 x_2 = -k_3 x_3 \quad (2)$$

$$\frac{k_1}{k_2} = \frac{x_2}{x_1}; \frac{k_2}{k_3} = \frac{x_3}{x_2}; \frac{k_3}{k_1} = \frac{x_1}{x_3} \quad (3)$$

Thus, when an impact force F is applied to the damper 600 it will be transmitted to each damper element 601, 602, and 603, causing the stiffer (larger spring constant, $k_1$) damper element 601 to compress less than damper element 603, which has a smaller spring constant, $k_3$. Nevertheless, each damper element 601, 602, and 603, will compress a respective amount based on their corresponding spring constant and the total deflection of the head stabilizer will be equal to the sum of the compression of each damper element 601, 602, and 603.

As noted above, the damper 600 may directly replace damper 100 in helmet 400, for example. In such an embodiment, the upper lip 601' is connected to the outer shell 401 of the helmet 400 and head stabilizer 604 will be positioned in place of head stabilizer 4 in FIG. 4C. In an impact between the helmet and an object, the impact force F will be transmitted, and the user's head will move relative to the outer shell 401 of the helmet 400, causing corresponding movement of the head stabilizer 604, which is engaged with the wearer's head, and compression of the damper 600. Depending on the magnitude of the translational impact force F and the compressibility of the damper elements 601, 602, and 603, and the liner 402, one or more of the damper elements 601, 602, and 603 may become fully compressed. The compression of the damper elements 601, 602, and 603, partially or wholly, absorbs energy of the impact and slows the transmission of the impact force to the user's head, thereby facilitating a reduction of the severity of the impact to the wearer's head. The material employed and the values selected for compressibility or stiffness for each damping device 601, 602, and 603 is such that it allows the damper 600 to carry out its desired effect in absorbing repetitive impact forces including translational and rotational impact forces.

Figure 7A:
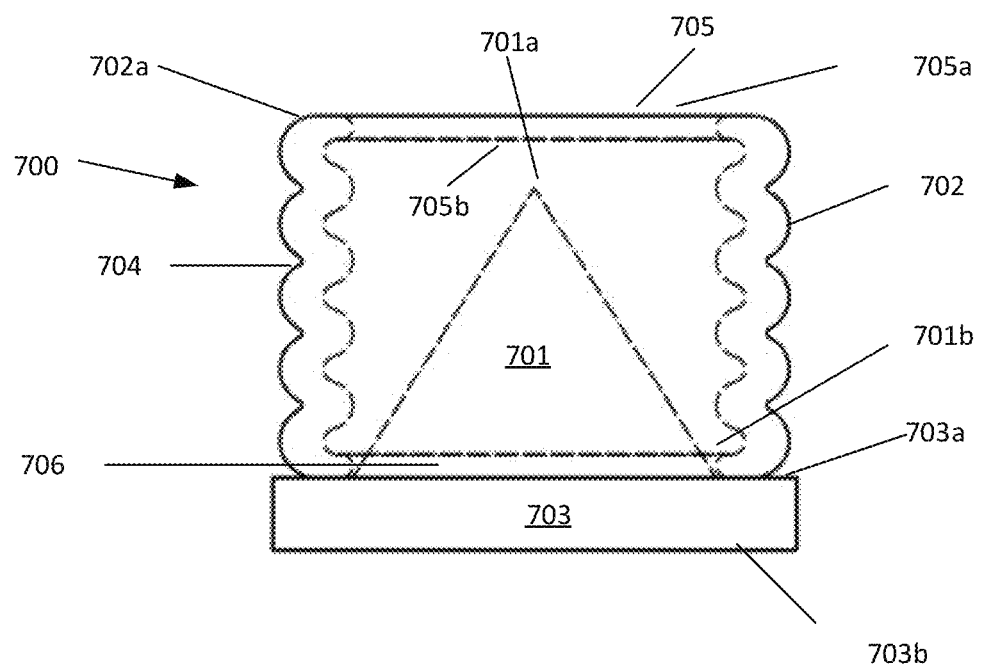
FIG. 7A is a center section view of another embodiment of a damper, in accordance with an aspect of the disclosure.
Figure 7B:
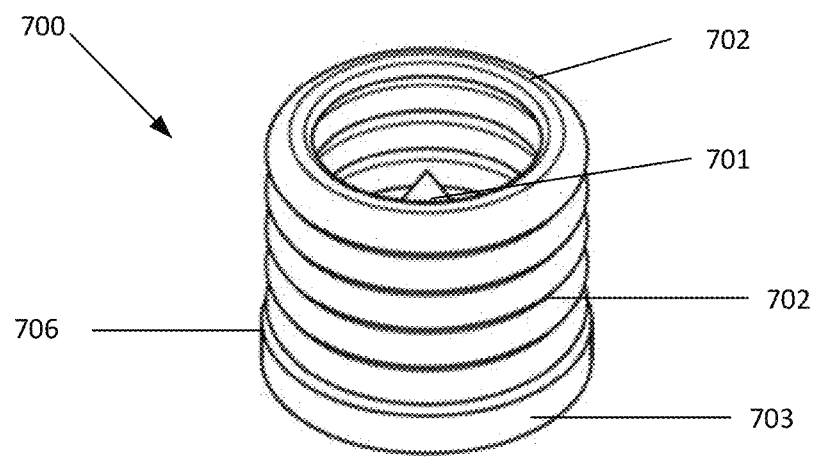
FIG. 7B is an isometric view of the damper of FIG. 7A with a cover removed for clarity of illustration.
Figure 8A:
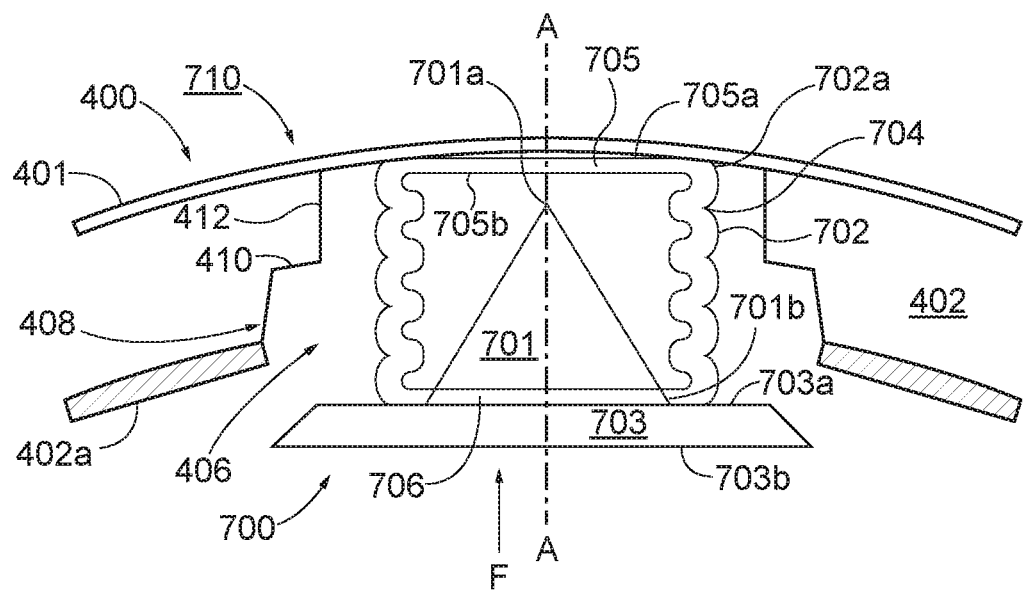
FIG. 8A illustrates the damper of FIG. 7A coupled to a helmet.
Figure 8B:
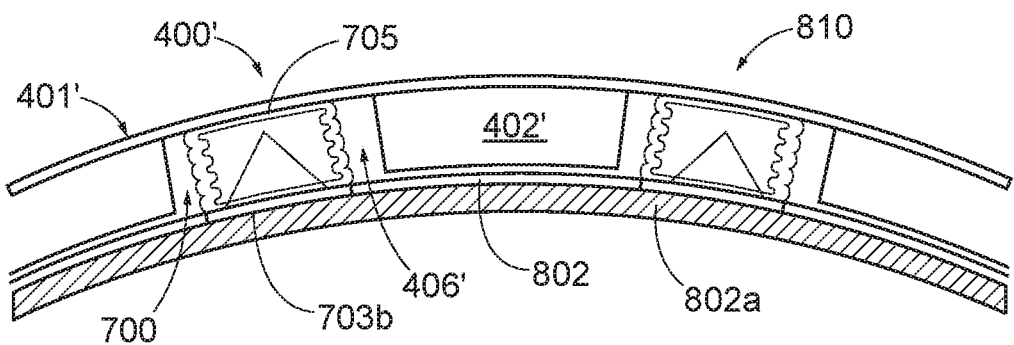
FIG. 8B illustrates the damper of FIG. 7A incorporated into another helmet.

FIGS. 7A and 7B illustrate another embodiment of a damper 700 that may be incorporated into a helmet, such as helmet 400 shown in FIG. 8A. The damper 700 includes a compressible cone 701, concentrically arranged along longitudinal axis A-A inside a cylindrical compressible element 702. The compressible element 702 may be a spring or a flexible convoluted tube. The damper 700 also includes a base 703, which is connected to the cone 701 and the compressible element 702. The cone 701 has a tip 701a and a circular base 701b longitudinally spaced along the axis A-A from the tip 701a. The compressible element 702 has a generally cylindrical wall 704, which may be smooth or convoluted, that extends from an attached circular base 706 to an attached circular cover 705 (which is omitted for clarity of illustration in FIG. 7B). The circular base 701b of the cone 701 and the circular base 706 of the compressible element 702 are fused or adhered to an upper surface 703a of the base 703. As shown in FIG. 8B, the base 703 can also be part of a portion of a liner 402 of certain thickness and made of the same material as the cone 701 and the compressible element 702. Also, the base 703 may take the form of head stabilizer 4, described above. As shown in FIG. 8A, the tip 701a of the cone 701 is longitudinally disposed along axis A-A between the cover 705 and the base 706 of the compressible element 702.

The damper 700 may be made wholly or partially of silicone rubber with the cone 701, the compressible element 702, and the base 703 all having the same density or different densities. Alternatively, the material forming the damper 700 may include at least one of PORON®, ARMOURGEL™, D3O®, expanded thermoplastic urethane (ETPU), and other suitable materials.

In one example of the damper 700, the base 701b of the cone 701 has a diameter of about 25.0 mm; the cone 701 has a height of about 20.0 mm; the circular base 703 has a thickness of about 5.0 mm; the circular base 706 has a diameter of about 36.0 mm; the damper element 702 has an inner diameter of about 25.0 mm and an external diameter of about 30.0 mm (the wall 704 has a thickness of about 5.0 mm); the damper element 702 has a longitudinal uncompressed length of about 25.0 mm; the height of each damping coil (if a coil spring is used as damping element 702) or convolution (if a convoluted element is used as damper element 702) of the damping element 702 is about 5.0 mm. Such an example damper 700 may absorb impacts up to 300 g's.

The compressibility of the damper 700 may be based on the geometry and material properties of the damper 700. For example, the compressibility of the cone 701 may be based on the geometry and of the material properties (e.g., density) of the cone 701. In the case of cone 701 formed of one uniform material, due to the tapered profile of the cone, the compressibility of the cone 701 decreases along the axis A-A from the tip 701a of the cone 701 to the base 701b of the cone 701. Thus, as the cone 701 is longitudinally compressed by a force, the force will be resisted by progressively stiffer (less compressible) cone 701.

On the other hand, the compressibility of element 702 may not be a function of position along axis A-A. Instead, the compressible member 702 may exhibit a uniform compressibility with increasing compression, in similar manner to a linear, Hookean spring that has a spring constant. The compressibility of element 702 may be based on the thickness of the wall 704, the number of damping coils (if the compressible element 702 is a coil spring) or convolutions (if the compressible element 702 is convoluted), and the material(s) forming the compressible element 702 (e.g., silicone). The material(s) used and the values selected for compressibility or stiffness for each portion of the damper 700 are selected to allow the damper 700 to absorb repetitive impact forces including translational and rotational impacts.

The damper 700 may be integrated into various types of sports helmets (e.g., for football, hockey, surfing, watersports, cycling, skiing, skating, horse riding, rodeo riding, gymnasium) as well as helmets used by construction workers and emergency personnel. FIG. 8A shows a system 710 that includes the damper 700 incorporated into the helmet 400, described in detail above. As shown, the base 703 may take the form of the above-described head stabilizer 4 and may be separate from the liner 402. The circular cover 705 of the compressible element 702 may be adhered or fused to an inner side of the outer shell 401 of the helmet 400. Also, the circular cover 705 may be omitted and an upper edge 702a of the compressible element 702 may be fused directly to the inner side of the outer shell 401 of the helmet 400. When the damper 700 is used in the helmet 400, a lower or inner side 703b of the base 703 is configured to engage a head of a wearer of the helmet so that when placed on the head 103 in the manner shown in FIG. 4C, the base 703 will be flush with the comfort liner 402a, while remaining spaced from the shoulder 410. Also, when base 703 is flush with comfort liner 402a, the tip 701a of the cone will be in compression with the cover 705 (or if the cover 705 is omitted, the tip 701a of the cone 701 engages and compresses against the inside surface of the outer shell 401 of the helmet 400.

During an impact between the helmet 400 and an object, rotational and translational impact forces are directed towards the head causing the damper 700 and liner 402 to compress. In the example shown in FIG. 8A, a translational force "F" is shown. At the same time the head is travelling in the opposite direction (Newton's third law of motion—equal and opposite forces) causing the head to compress the base 703 of the damper 700, which, in turn, compresses the compressible element 702, causing the cone 701 to move longitudinally along axis A-A towards the cover 705 due to the connection of the cone 701 to the base 703 and compress further. If the impact force F is sufficiently large, the compressible element 702 and cone 701 continue to compress along with the liner 402 (due to eventual engagement of the base 703 with the shoulder 410) When both the element 702 and the cone 701 both undergo compression, they will both distribute the impact force in parallel. However, due to the non-uniform compressibility of the cone 701, noted above, when the impact force causes both the spring 702 and the cone 701 to undergo compression, as the cone 701 compresses it will become progressively stiffer and, thus, absorb more of the impact force. As a result, the head that is engaged with the base 703 may be gradually decelerated to reduce the magnitude of forces transmitted to the head.

FIG. 8B shows a system 810 that includes a helmet 400', similar to helmet 400 of FIG. 8A, and having a liner 402' (e.g., made of EPS) that defines openings 406' that have a uniform cylindrical wall. Also, the system 810 includes dampers 700 attached to an inner side of an outer shell 401' of the helmet 400'. The system 810 further includes an additional liner 802 (e.g., made of the same material as outer damper element 702 and cone 701, such as D3O®) that is spaced from the liner 402' but is connected between the bases 703b of dampers 700. Also, the system 810 includes a comfort liner 802a (e.g., made of ethylene-vinyl acetate (EVA)) that conforms and attaches to an inner side of the liner 802. The liner 402' may be made of either EPS or may be the same material as liner 802 or some other suitable material. By joining the bases 703b of the dampers 700 together, the dampers are further flexurally stiffened to withstand rotational impact forces.

Figure 8C:
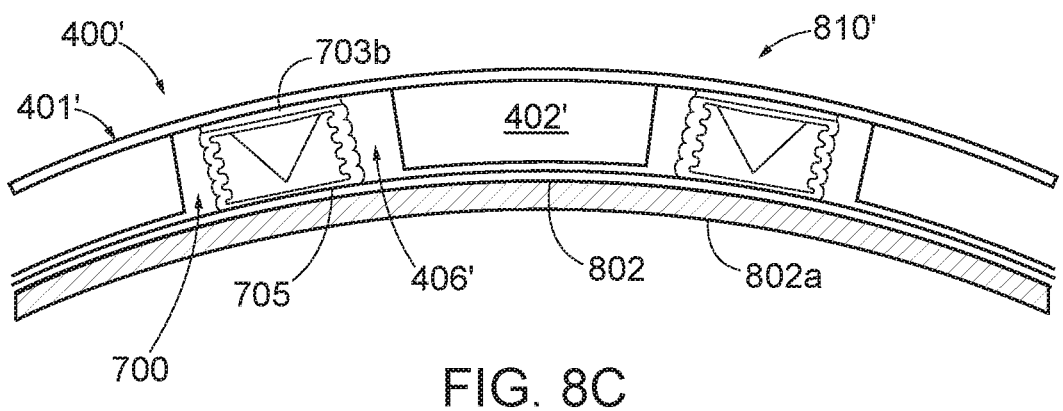
FIG. 8C illustrates the damper of FIG. 7A incorporated into another helmet.

FIG. 8C shows an alternate system 810' to system 810 in which the dampers 700 are oriented reverse to those shown in FIG. 8B. Specifically, the dampers 700 have an inverted orientation in helmet 400' such that for each damper 700 the base 703b is connected to the outer shell 401 of the helmet 400 and the cover 705 is connected to the liner 802.

The systems 810 and 810' shown respectively in FIG. 8B and FIG. 8C can represent a head-band protector with the outer shell 401' being made of vinyl material. In one example, the system 810 shown in FIG. 8B may be configured as a head band in which the liner 802, bases 703b, and cones 701 are made of one-piece material (D3O®). Also, the outer damper elements 702 are formed separately (and may also be made of D3O®) are joined (e.g., adhered/glued) to the outer shell 401' (e.g., made of vinyl) and the circular bases of 702 are joined (e.g., adhered/glued) to the liner 802 to receive and/or enclose the cones 701. In such an example, the liner 402 may also be made of the same material as the liner 802, bases 703b, cones 701, and outer damper elements 702 (e.g., D3O®) or a different suitable material.

Also, in another example, the system 810' shown in FIG. 8C may be configured as a head band in which the liner 802 and outer damper elements 702 are made of one piece material (e.g., D3O®) and the circular opening top piece of 702 are joined (e.g., adhered/glued) to 703b to receive or enclose the cones 701. In this example, the cones 701 (including bases 703b) may be formed separately and joined (e.g., adhered/glued) to the outer shell 401' (e.g., made of vinyl).

Further, in the systems 810 and 810', if the liner 402' is made of EPS, then the outer shell 401' may be made from PVC (plastic) or fiberglass/carbon. Specifically, in one example, the outer shell 401' is made of fiberglass/carbon or PVC, the liner 402' is made of EPS, and the liner 802 and the damper elements (701 and 702) are made of D3O®, silicon rubber, or some other suitable material.

The various damper elements described herein may be considered "linear" or "non-linear" based on their force-deflection characteristics and how close their force-deflection response is relative to Hooke's Law (F=kX). That is, as herein defined, a linear damper element is considered to be one that has a substantially constant spring rate (k) as defined by Hooke's Law. Also, as herein defined, a non-linear damper element is considered to be one that does not have a substantially constant spring rate (k), and which may have a spring rate that is itself a function of the amount of deflection or compression of the damper element. Nevertheless, it will be appreciated that any of the damper elements described herein, whether linear or non-linear, may be interchanged and/or used in conjunction in various combinations to achieve a desired damping effect. Also, while non-linear damping elements have been described as being conical, it will be appreciated that other forms of non-linear damping elements may be used that do not have a conical form. Also, while linear damper elements have been described as being cylindrical, it will be appreciated that cylindrical damper elements may also be non-linear. Thus, while various embodiments of damping systems have been individually described herein, it will be appreciated that additional damper elements may be added or removed from those systems and that non-linear damping elements may be substituted for linear damping elements and vice versa to achieve desired damping effects. Further, while some dampers have been described as being used in a helmet, such dampers may also be used in a headband or headguard, and while some dampers have been described as being used in a headband or headguard, such dampers may also be used in a helmet. Moreover, the various embodiments of dampers and systems described herein are not mutually exclusive to each other and features of some embodiments may be combinable with features of other embodiments to form various damper and system configurations, some of which are described in greater detail below, for example.

Figure 9A:
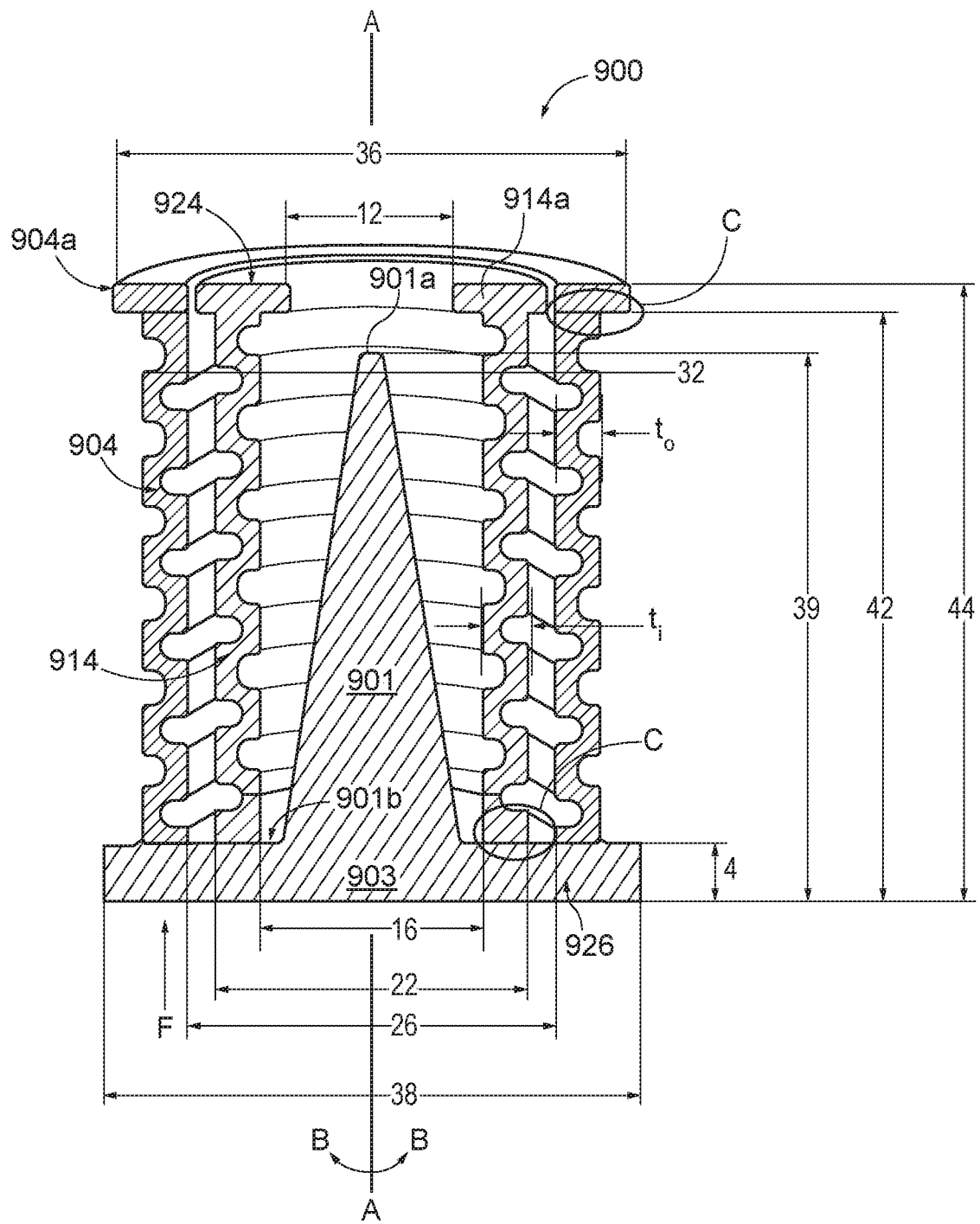
FIG. 9A is a center section view of another embodiment of a damper, in accordance with an aspect of the disclosure.

FIG. 9A shows an embodiment of a damper 900 that is similar in arrangement to damper 700, and adds an additional inner cylindrical damper element 914. The damper 900 shown in FIG. 9A includes three resilient, elastic, and compressible damper elements 901, 904, and 914 that are coupled to a head stabilizer 903, and are concentric about axis A-A in FIG. 9A. Damper elements 904 and 914 are cylindrical and damper element 901 is conical. The damper 900 extends longitudinally along axis A-A from an outer end 924 to an inner end 926. The head stabilizer 903 is attached to the damper 900 at its inner end 926. The two cylindrical damper elements 904 and 914 surround the conical damper element 901, which is the innermost damper element in the damper 900 shown in FIG. 9A. The damper 900 is configured to be attached to a head covering, such as a headguard or a helmet.

In FIG. 9A the damper 900 is shown in a neutral, uncompressed state. The damper 900 is configured for longitudinal compression and expansion along axis A-A in response to translational impact force application to and removal from the damper 900. Also, the damper 900 is configured to bend or deflect laterally (like a cantilever beam) in a direction transverse to the longitudinal axis A-A about its point of attachment at the outer end 924 in response to a bending moment applied to the damper 900. For example, the damper 900 shown in FIG. 9A may deflect in an arc (shown by arrow B) about the outer end 924 of the damper 900. The damper 900 is flexible and resilient and is configured to return to the neutral state when external impact forces are no longer applied to the damper 900. In the example embodiment shown in FIG. 9A, the lengths of the cylindrical damper elements 904 and 914 are equal, and thus form an annular column that provides increased resistance to lateral deflection and bending moment, as well as longitudinal deflection (i.e., linear compression), in comparison to the damper 700.

The cylindrical damper elements 904 and 914 may each be a spring or a flexible convoluted tube. The respective cylindrical walls of the cylindrical damper elements 904 and 914 are longitudinally compressible and may be smooth or convoluted on their radially inner and/or outer sides.

The conical damper element 901 has a tip 901a and a base 901b (which may be circular) longitudinally spaced along the axis A-A from the tip 901a. The base 901b of conical damper element 901 may be fused or otherwise attached to the head stabilizer 903. As shown in FIG. 9A, the tip 901a of the cone 901 is longitudinally disposed along axis A-A between the outer end 924 of the damper 900 and the head stabilizer 903. The tip 901a may be flat, as shown in FIG. 9A, such that the conical damper element 901 can be considered a truncated cone. Thus, in at least one embodiment the conical damper element 901 is frustoconical.

The head stabilizer 903 may be free to move and may be separated from other dampers and structures or may be part of a portion of a liner that connects the head stabilizer to one or more other head stabilizers. An example of such a liner is liner 802 of FIGS. 8B and 8C.

The inner cylindrical damper element 914 surrounds the conical damper element 901 and extends from the head stabilizer 903 to a base 914a at the outer end of the damper 924. The outer cylindrical damper element 904 surrounds the inner cylindrical damper element 914 and the conical damper element 901. The outer cylindrical damper element 904 is radially spaced from the inner cylindrical damper element 914. The outer cylindrical damper element 904 extends from the head stabilizer 903 to a base 904a at the outer end 924 of the damper 900.

The bases 904a and 914a of all the cylindrical damper elements 904 and 914 may be joined together at the outer end 924 of the damper 900, and the outer surfaces of those bases may be used as mounting surfaces for mounting the damper 900 to a surface of a head covering, such as a helmet or headband, examples of which are described above and additional examples are described in further detail below.

The damper 900 may be made wholly or partially of silicone rubber with the conical damper element 901 and the cylindrical damper elements 904 and 914 and the head stabilizer 903 all having the same density or different densities. Alternatively, the material forming the damper 900 may include at least one of PORON®, ARMOURGEL™, D3O®, expanded thermoplastic urethane (ETPU), and other suitable materials. The damper 900 may be formed of a unitary piece (e.g., integrally molded silicone rubber) or may be made from multiple pieces that are joined together during the manufacture of the damper 900. For example, damper elements 904, 903, and 901 may be molded as a single member and joined, during manufacture of the damper 900, to damper element 914 and joined together (e.g., adhesively) at locations C at the outer 924 and inner ends 926 of the damper 900.

In one example of the damper 900, the thickness of the cylindrical wall of the outer cylindrical damper element 904 is greater than the thickness of the cylindrical wall of the inner cylindrical damper element 914. Also, while the longitudinal distance (length) between the tip 901a of the conical damper element 901 and its base 901b is shown being less than the length of the damper 900, the length of the conical damper element 901 may be larger or smaller. For example, in one embodiment, the tip 901a of the conical damper element 901 may engage or otherwise contact the bases 904a and 914a of the cylindrical damper elements 904 and 914 in the neutral configuration so that the conical damper element 901 may be initially compressed upon initial compression of the damper 900, along with the cylindrical damper elements 904 and 914. Of course, shortening the length of the conical damper element 901 (relative to the length shown in FIG. 9A) can delay the timing of its engagement such that the cylindrical damper elements 904 and 914 may compress longitudinally outwardly a greater extent (as compared to the embodiment shown in FIG. 9A) during an impact before the conical damper element begins to compress. In one example of the damper 900, the base 901b of the cone 901 has a diameter of about 16.0 mm; the cone 901 has a height of about 35.0 mm; the head stabilizer 903 has a thickness of about 4.0 mm and has a diameter of about 38.0 mm; the outer cylindrical damper element 904 has an outer diameter of about 32.0 mm and a wall thickness "$t_o$" of about 3.0 mm (material thickness is about 1.5 mm); the outer cylindrical damper element 904 has a longitudinal uncompressed length of about 40.0 mm; the inner cylindrical damper element 914 has an outer diameter of about 22.0 mm and a wall thickness "$t_i$" of about 3.0 mm (material thickness is about 1.5 mm); the inner cylindrical damper element 914 has a longitudinal uncompressed length of about 40.0 mm. The foregoing dimensions are shown in FIG. 9A. Such an example damper 900 may absorb impacts up to 300 g's.

Figure 9B:
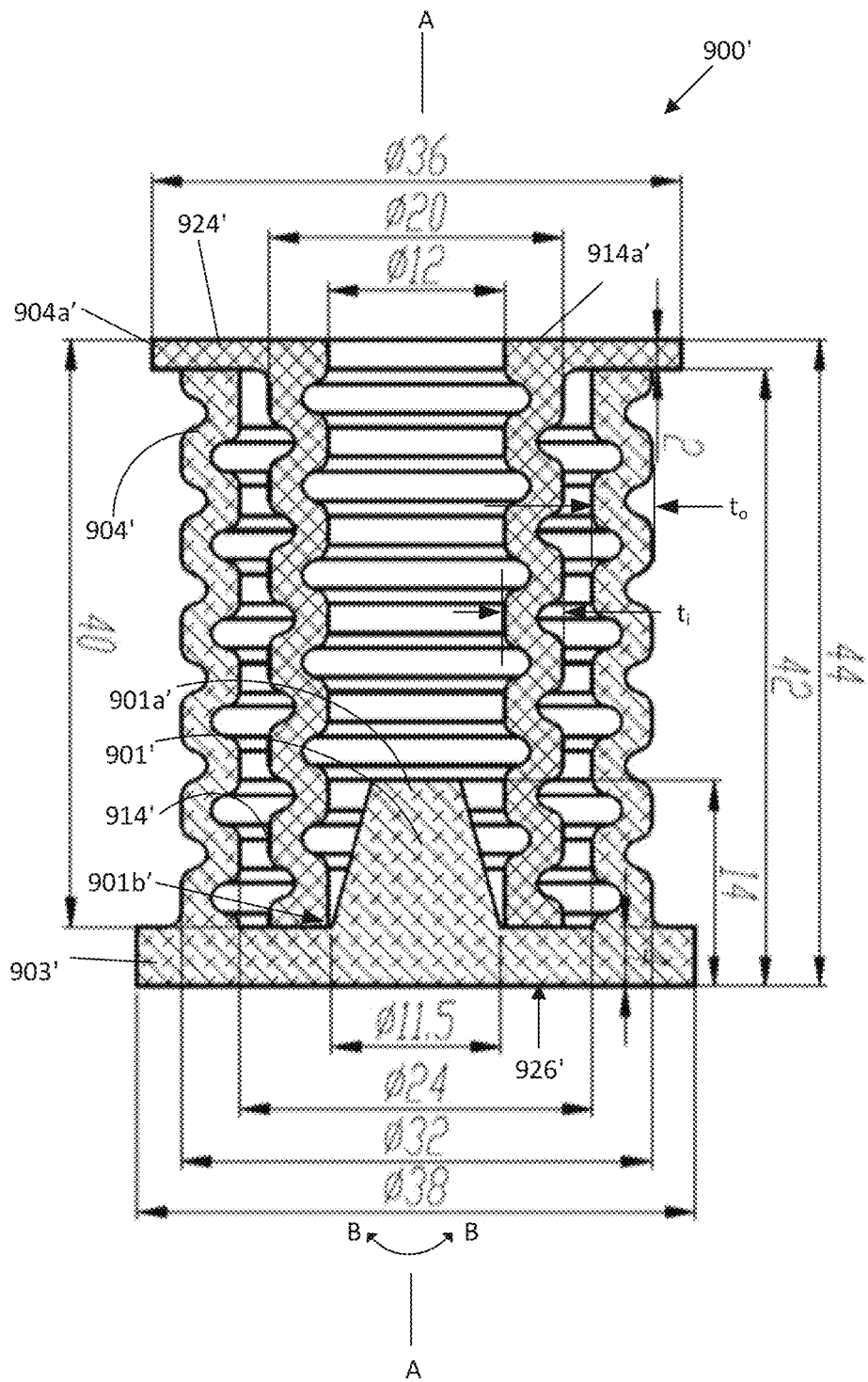
FIG. 9B is a center section view of another embodiment of a damper, in accordance with an aspect of the disclosure.

FIG. 9B shows an alternative damper 900' having corresponding elements to those shown in FIG. 9A, but appended with a " ' " in FIG. 9B. In FIG. 9B the damper 900' is shown in a neutral, uncompressed state. The damper 900' is shown with different dimensions to those of damper 900 shown in FIG. 9A and described herein. Of note, the base 901b' of the cone 901' has a diameter of about 11.5 mm; the cone 901' has a height of about 10.0 mm (measured above the head stabilizer 903'); the head stabilizer 903 has a thickness of about 4.0 mm and has a diameter of about 38.0 mm; the outer cylindrical damper element 904' has an outer diameter of about 32.0 mm and a wall thickness "$t_o$" of about 4.0 mm (the material thickness is about 2.0 mm); the outer cylindrical damper element 904' has a longitudinal uncompressed length of about 40.0 mm; the inner cylindrical damper element 914 has an outer diameter of about 20.0 mm and a wall thickness "$t_i$" of about 4.0 mm (the material thickness is about 2.0 mm); the inner cylindrical damper element 914 has a longitudinal uncompressed length of about 40.0 mm. All features of damper 900 described herein apply, mutatis mutandis, to damper 900'.

The compressibility of the damper 900 may be based on the geometry and material properties of the damper 900. For example, the compressibility of the conical damper element 901 may be based on the geometry and of the material properties (e.g., density) of the conical damper element 901. In the case of conical damper element 901 being formed of one uniform material, due to the tapered profile of the cone, the compressibility of the cone 901 may decreases along the axis A-A from the tip 901a of the cone 901 to the base 901b of the cone 901. Thus, as the cone 901 is longitudinally compressed by a force, the force will be resisted by progressively stiffer (less compressible) conical damper element 901.

On the other hand, the compressibility of one or more of cylindrical damper elements 904 and 914 may not be a function of the position along axis A-A. Instead, the compressible damper elements 904 and 914 may exhibit a uniform compressibility with increasing compression, in similar manner to a linear, Hookean spring that has a spring constant. The compressibility of cylindrical damper elements 904 and 914 may be based on the thickness of their respective cylindrical walls, the number of damping coils (if the respective cylindrical damper element is a coil spring) or convolutions (if the respective cylindrical damper element is a compressible element is convoluted), and the material(s) forming the respective cylindrical damper element (e.g., silicone). The material(s) used and the values selected for compressibility or stiffness for each portion of the damper 900 are selected to allow the damper 900 to absorb repetitive impact forces including translational and rotational impacts.

Due to the lengths of the cylindrical damper elements 904 and 914 and the configuration of the conical damper element 901, the damper 900 is configured so that the various damper elements may be compressed in stages based on the amount of force transmitted to the damper. Initially following an impact, the translational and rotational impact forces will cause the one or more of the damper elements 901, 904, and 914 to compress based on their respective stiffnesses and will flex or bend laterally based on the thickness, number of convolutions, and radial spacing between cylindrical damper elements 904 and 914.

FIG. 9A shows a force F applied to the head stabilizer 903, which represents the translational force that may be exerted by a user's head to the head stabilizer 903 during an impact. If the force F is large enough, the inner and outer cylindrical damper elements 914 and 904 will compress together first, while the conical inner damper element 901 and the head stabilizer 903 move longitudinally outward along axis A-A. If the force F is still large enough, the head stabilizer 903 may move further outward so that the tip 901a of the conical damper element 901 may engage or otherwise contact the bases 904a and 914a of the cylindrical damper elements 904 and 914. Thereafter, if the force F continues to cause the head stabilizer 903 to move outwardly along axis A-A, all of the cylindrical damper elements 904 and 914, as well as the conical damper element 901 will be further compressed until they are able to balance the force F without becoming fully compressed or until they are all fully compressed. Thereafter, the damper elements 904, 914, and 901 are configured to elastically deform back to their neutral state shown in FIG. 9A, unless the deformation caused by the impact has permanently damaged the damper elements, in which case they will not return to their neutral state shown in FIG. 9A.

The radial spacing between the cylindrical damper elements 904 and 914 and the equal lengths of those cylindrical damper elements stiffens the damper 900 to resist lateral bending about the axis A-A in response to rotational forces transmitted to the damper 900 during an impact event to a greater extent than damper 700. Moreover, when the outer and inner cylindrical damper elements 904 and 914 are compressed and the conical damper 901 is compressed, the area moment of inertia of the damper 900 is effectively increased as compared to the stiffness of the damper 900 shown in its neutral state in FIG. 9A.

While two cylindrical damper elements are shown in the embodiment of the damper 900 in FIG. 9A, it will be appreciated that more than two cylindrical dampers may be used. It will be appreciated that damper 900 may substitute for damper 100 in system 101 and in helmet 400. Any modification to the damper 900 or to system 101 would be within the level of one of ordinary skill in the art. Also, it will be appreciated that damper 900 may substitute for damper 150 in helmet 500, and for damper 700 in systems 710 and 810. Any modification to the damper 900 or to helmet 500 or systems 710 and 810 would be within the level of one of ordinary skill in the art.

Figure 10A:
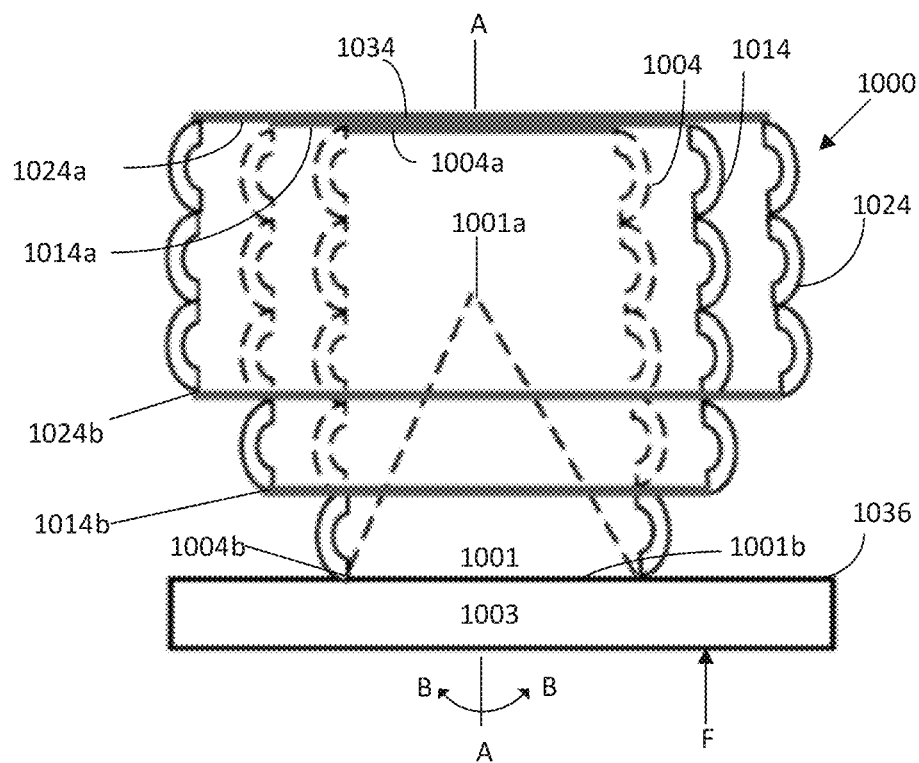
FIG. 10A is a center section view of another embodiment of a damper, in accordance with an aspect of the disclosure.

FIG. 10A shows an embodiment of a damper 1000 that is similar to damper 700, and also includes additional damper elements, as described in greater detail below. For example, the damper 1000 includes four elastic and compressible damper elements 1001, 1004, 1014, and 1024 that are coupled to a head stabilizer 1003 and that are concentric about axis A-A in FIG. 10A. The damper elements 1004, 1014, and 1024 are cylindrical and damper element 1001 is conical. The damper 1000 extends longitudinally along axis A-A from an outer end 1034 to an inner end 1036. The head stabilizer 1003 is attached to the damper 1000 at its inner end 1036. The three cylindrical damper elements 1004, 1014, and 1024 surround the conical damper element 1001, which is the innermost damper element in the damper 1000 shown in FIG. 10A. The damper is configured to be attached to a head covering, such as a headband or a helmet shell.

In FIG. 10A the damper 1000 is shown in a neutral, uncompressed state. The damper 1000 is configured for longitudinal compression and expansion along axis A-A in response to translational impact force application to and removal from the damper 1000. The damper 1000 is also configured to deflect or bend laterally with respect to the axis A-A along an arc B shown in FIG. 10A in response to rotational forces applied to the damper 1000 during an impact. The damper 1000 is flexible and resilient and is configured to return to the neutral state when external impact forces are no longer applied to the damper 1000.

The cylindrical damper elements 1004, 1014, and 1024 may each be a spring or a flexible convoluted tube. The respective walls of the cylindrical damper elements are longitudinally compressible and may be smooth or convoluted on their radially inner and/or outer sides.

The conical damper element has a tip 1001*a* and a base 1001*b* (which may be circular) longitudinally spaced along the axis A-A from the tip 1001*a*. The base 1001*b* may be fused or otherwise attached to the head stabilizer 1003. As shown in FIG. 10A, the tip 1001*a* of the cone 1001 is longitudinally disposed along axis A-A between the outer end 1034 of the damper 1000 and the head stabilizer 1003.

The head stabilizer 1003 may be free to move and may be separated from other dampers and structures or may be part of a portion of a liner that connects the head stabilizer to one or more other head stabilizers. An example of such a liner is liner 802 of FIGS. 8B and 8C.

In the example embodiment shown in FIG. 10A, the lengths (along axis A-A) of the cylindrical damper elements 1004, 1014, and 1024 as measured in their neutral state, are different from one another so that the inner ends 1004*b*, 1014*b*, and 1024*b* of each respective damper element 1004, 1014, and 1024 are longitudinally spaced from each other. Specifically, in the example shown, the length of the damper elements 1004, 1014, and 1024 increases with decreasing radial distance away from the axis A-A, such that the inner cylindrical damper element 1004 has a first length, the middle damper element 1014 has a second length smaller than the first length, and the outer damper element 1024 has a third length that is smaller than both the first and second lengths. The vertical spacing of the bottom ends 1004*b*, 1014*b*, and 1024*b*, provides for various combinations of damper elements to be compressed based on the magnitude of impact force applied to the damper 1000, further details of which will be described in detail below.

The inner cylindrical damper element 1004 surrounds the conical damper element 1001 and extends from its lower end 1001*b* at the head stabilizer 1003 to a base 1001*a* at the outer end 1034 of the damper. The middle cylindrical damper element 1014 surrounds the inner cylindrical damper element 1004 and the conical damper element 1001. The middle cylindrical damper element 1014 is radially spaced from the inner cylindrical damper element 1004. The middle cylindrical damper element 1014 extends from a base 1014*a* at the outer end 1034 of the damper to the inner end 1014*b*, which is longitudinally spaced from the head stabilizer 1003. The outer cylindrical damper element 1024 surrounds the middle cylindrical damper element 1014, the inner cylindrical damper element 1004, and the conical damper element 1001. The outer cylindrical damper element 1024 is radially spaced from the middle cylindrical damper element 1014. The outer cylindrical damper element 1024 extends from a base 1024*a* at the outer end 1034 of the damper 1000 to the inner end 1024*b*, which is also longitudinally spaced from the head stabilizer 1003. Thus, the inner ends 1004*b*, 1014*b*, and 1024*b* of the cylindrical damper elements 1004, 1014, and 1024 are staggered from one another.

The bases 1004*a*, 1014*a*, and 1024*a* of the cylindrical damper elements 1004, 1014, and 1024 may be joined together at the outer end 1034 of the damper 1000, and the outer surfaces of those bases may be used as mounting surfaces for mounting the damper to a surface of a head covering, such as a helmet and a headguard, some examples of which are described above and additional examples are described in further detail below.

The damper 1000 may be made wholly or partially of silicone rubber with the conical damper element and the cylindrical damper elements and the head stabilizer all having the same density or different densities. Alternatively, the material forming the damper 1000 may include at least one of PORON®, ARMOURGEL™, D3O®, expanded thermoplastic urethane (ETPU), and other suitable materials. The damper 1000 may be formed of a unitary piece (e.g., integrally molded silicone rubber) or may be made from multiple pieces that are joined together during the manufacture of the damper 1000.

In one example of the damper 1000, the thickness of the cylindrical wall of the outer cylindrical damper element 1024 is greater than the thickness of the cylindrical wall of the middle cylindrical damper element 1014, and the thickness of the cylindrical wall of the middle cylindrical damper element 1014 is greater than the thickness of the cylindrical wall of the inner cylindrical damper element 1004. Also, while the longitudinal distance (length) between the tip 1001*a* of the conical damper element 1001 and its base 1001*b* is shown being less than the length of the damper 1000, the length of the conical damper element 1001 may be larger or smaller. For example, in one embodiment, the tip 1001*a* of the conical damper element 1001 may engage or otherwise contact the bases 1004*a*, 1014*a*, and 1024*a* of the cylindrical damper elements 1004, 1014, and 1024 in the neutral configuration so that the conical damper element 1001 may be initially compressed upon initial compression of the damper 1000, along with the cylindrical damper element 1024. Of course, shortening the length of the conical damper element 1001 (relative to the length shown in FIG. 10A) can delay the timing of its engagement such that the cylindrical damper elements 1024, 1014, and 1004 may compress longitudinally outwardly a greater extent (as compared to the embodiment shown in FIG. 10) during an impact before the conical damper element begins to compress.

In one example of the damper 1000, the base 1001b of the cone 1001 has a diameter of about 25.0 mm; the cone 1001 has a height of about 20.0 mm; the head stabilizer 1003 has a thickness of about 5.0 mm and has a diameter of about 54.0 mm; the outer cylindrical damper element 1024 has an outer diameter of about 54.0 mm and a wall thickness of about 2.5 mm; the outer cylindrical damper element 1024 has a longitudinal uncompressed length of about 15.0 mm; the middle cylindrical damper element 1014 has an outer diameter of about 45.0 mm and a wall thickness of about 3.0 mm; the middle cylindrical damper element 1014 has a longitudinal uncompressed length of about 20.0 mm; the inner cylindrical damper element 1004 has an outer diameter of about 35.0 mm and a wall thickness of about 5.0 mm; the inner cylindrical damper element 1004 has a longitudinal uncompressed length of about 25.0 mm. Thus, in the example, the thicknesses of the cylindrical dampers decrease with increasing radial distance from the axis A-A. However, in alternate embodiments, the thicknesses of the cylindrical dampers may increase with increasing radial distance from the axis A-A. Such an example damper 1000 may absorb impacts up to 300 g's.

The compressibility of the damper 1000 may be based on the geometry and material properties of the damper 1000. For example, the compressibility of the conical damper element 1001 may be based on the geometry and of the material properties (e.g., density) of the conical damper element 1001. In the case of conical damper element 1001 being formed of one uniform material, due to the tapered profile of the cone, the compressibility of the cone 1001 may decreases along the axis A-A from the tip 1001a of the cone 1001 to the base 1001b of the cone 1001. Thus, as the cone 1001 is longitudinally compressed by a force, the force will be resisted by progressively stiffer (less compressible) conical damper element 1001.

On the other hand, the compressibility of one or more of cylindrical damper elements may not be a function of position along axis A-A. Instead, the compressible damper elements 1004, 1014, and 1024 may exhibit a uniform compressibility with increasing compression, in similar manner to a linear, Hookean spring that has a spring constant. The compressibility of cylindrical damper elements 1004, 1014, 1024 may be based on the thickness of their respective cylindrical walls, the number of damping coils (if the respective cylindrical damper element is a coil spring) or convolutions (if the respective cylindrical damper element is a compressible element is convoluted), and the material(s) forming the respective cylindrical damper element (e.g., silicone). The material(s) used and the values selected for compressibility or stiffness for each portion of the damper 1000 are selected to allow the damper 1000 to absorb repetitive impact forces including translational and rotational impacts.

Due to the staggered inner ends 1004b, 1014b, 1024b of the cylindrical damper elements 1004, 1014, 1024 and the configuration of the conical damper element 1001, the damper 1000 is configured so that the various damper elements may be compressed in stages based on the amount of force transmitted to the damper 1000. Initially following an impact, the translational and rotational impact forces will cause the one or more of the damper elements to compress based on their respective stiffnesses and will flex laterally based on the thickness, number of convolutions, and radial spacing between cylindrical damper elements 1004, 1014, 1024. FIG. 10A shows a translational force F applied to the head stabilizer, which represents the translational force that may be exerted by a user's head to the head stabilizer 1003 during an impact. If the force F is large enough, the inner cylindrical damper element 1004 will compress first while the conical inner damper element 1001 and the head stabilizer 1003 move longitudinally outward along axis A-A. If the force F is still large enough, the head stabilizer 1003 may move further outward longitudinally to engage or otherwise contact the inner end 1014b of the middle cylindrical damper element 1014, which will compress along with the inner cylindrical damper element 1004. If the force F is still large enough to move the head stabilizer 1003 further longitudinally outward, then the tip 1001a of the conical damper element 1001 may engage or otherwise contact the bases 1004a, 1014a, 1024a of the cylindrical damper elements 1004, 1014, 1024 while the head stabilizer 1003 engages or otherwise contacts the inner end 1024b of the outer cylindrical damper element 1024. Thereafter, if the force F continues to cause the head stabilizer 1003 to move longitudinally outward along axis A-A, all of the cylindrical damper elements 1004, 1014, 1024 and the conical damper element 1001 will be further compressed until they are able to balance the force F without becoming fully compressed or until they are all fully compressed. Thereafter, the damper elements 1001, 1004, 1014, and 1024 are configured to elastically deform back to their neutral state shown in FIG. 10A, unless the deformation caused by the impact has permanently damaged the damper elements, in which case they will not return to their neutral state shown in FIG. 10A.

The radial spacing between the cylindrical damper elements 1004, 1014, 1024, as well as the staggered lengths of those elements provides the damper 1000 with various levels of lateral stiffness to bend about the axis A-A in response to rotational forces transmitted to the damper during an impact event. Specifically, the longitudinal spacing of the inner ends 1004b, 1014b, and 1024b from one another permits various combinations of the cylindrical damper elements 1004, 1014, 1024 to deflect based on whether or not the respective cylindrical damper elements are engaged or in contact with the head stabilizer 1003. Thus, in the neutral position, the inner cylindrical damper element 1004 is radially spaced from the middle cylindrical damper element 1014, permitting the inner damper element 1004 some range of lateral deflection without causing the contact between the inner and outer cylindrical damper elements 1004 and 1014. Also, if the force F that is applied does not cause the head stabilizer 1003 to engage or otherwise contact the middle cylindrical damper element 1014, then the lateral stiffness of the damper 1000 will be based primarily on the moment of inertia of the inner cylindrical damper element 1004, unless the bending moment imparted to the damper 1000 causes the inner cylindrical damper element 1004 to laterally deflect and engage or otherwise contact the middle or outer damper elements 1014 and 1024, which will then increase the moment of inertia to resist bending. Further, when the middle cylindrical damper element 1014 and inner cylindrical damper element 1004 are engaged or otherwise in contact with the head stabilizer 1003, the area moment of inertia of the damper 1000 is effectively increased as compared to the stiffness of the damper shown in its neutral state in FIG. 10A. Also, when the inner, middle, and outer cylindrical damper elements 1004, 1014, 1024 are engaged or otherwise in contact with the head stabilizer 1003, along with the conical damper element 1001, the area moment of inertia of the damper 1000 is effectively further increased. Thus, in other words, the multiple damper elements 1001, 1004, 1014, and 1024 of the damper 1000 can, in combination, increase the flexural rigidity of the damper 1000 as the damper compresses further in the outward direction. Thus, the multiple damper elements 1001, 1004, 1014, and 1024 can, when successively compressed, increase the flexural rigidity of the damper 1000 so that it will laterally deflect less under the same bending moment.

Figure 10B:
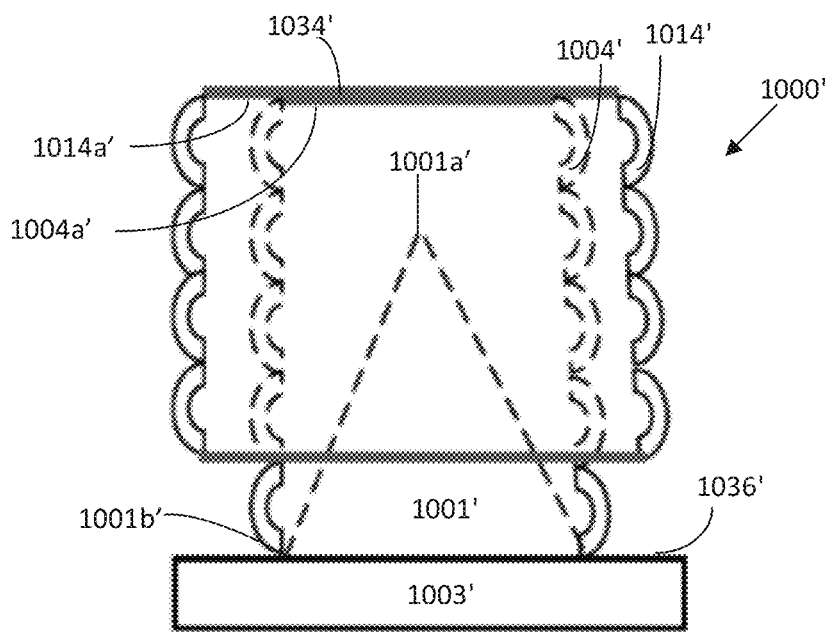
FIG. 10B is a center section view of another embodiment of a damper, in accordance with an aspect of the disclosure.
Figure 10C:
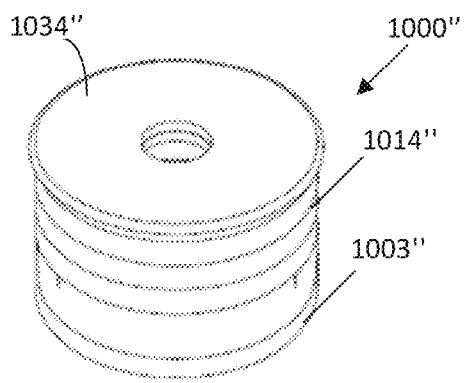
FIG. 10C is a perspective view of an alternate damper to that shown in FIG. 10B.
Figure 10D:
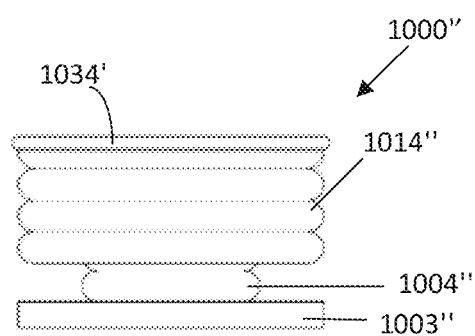
FIG. 10D shows a side elevation view of the damper shown in FIG. 10C.
Figure 10F:
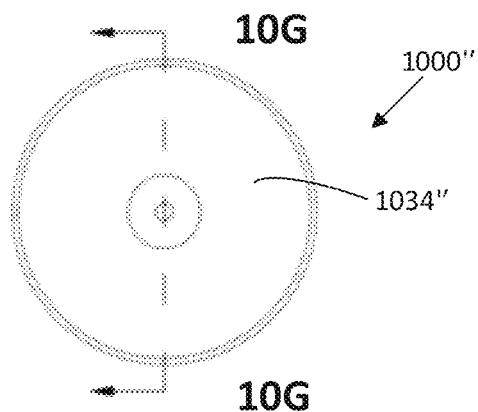
FIG. 10F shows a top view of the damper shown in FIG. 10C.
Figure 10E:
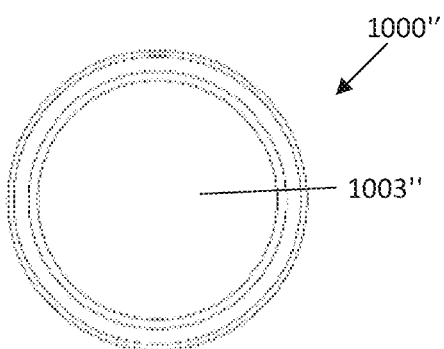
FIG. 10E shows a bottom view of the damper shown in FIG. 10C.
Figure 10G:
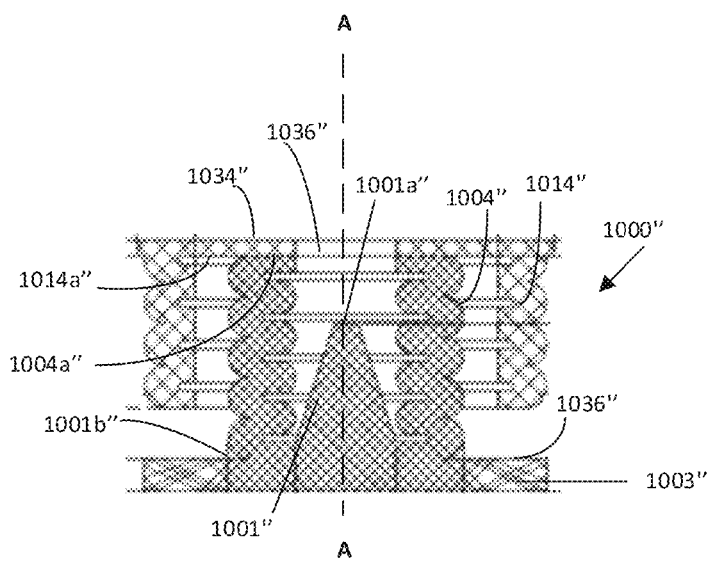
FIG. 10G is a center section view of the damper shown in FIG. 10C along section 10G-10G in FIG. 10F.

While three cylindrical dampers are shown in FIG. 10A, it will be appreciated that more or fewer than three cylindrical dampers may be used. For example, FIG. 10B shows a damper 1000', which is a modified version of the damper 1000 of FIG. 10A that omits the outer cylindrical damper element 1024 and, thus, reduces the overall lateral dimension of the damper compared to the damper of FIG. 10A. All other corresponding elements are appended with a "'" in FIG. 10B.

It will be appreciated that other modifications of the damper 1000 may be made and are within the scope of the invention. For example, the length of the middle cylindrical damper element 1014 may be longer than the lengths of both of the outer cylindrical damper element 1024 and the inner cylindrical damper element 1004 and the head stabilizer 1003 may be attached to an inner end of the middle cylindrical damper element 1014.

FIGS. 10C to 10H also show a damper 1000", which is a modified version of the damper 1000' of FIG. 10B. In FIGS. 10C to 10H all corresponding elements to those of damper 1000' are appended with a " ' " in FIGS. 10C to 10H. The damper 1000" extends longitudinally along central axis A-A. The damper 1000" has an outer cylindrical damper element 1014" and an inner cylindrical damper element 1004". The cylindrical damper elements 1014" and 1004" have respective outer ends 1014a" and 1004a" that are joined together at the outer end 1034" of the damper 1000". Unlike the damper 1000', the damper 1000" has an open end 1034" defined by a central hole 1036" formed in the outer ends 1004a" and 1014a" of the inner cylindrical damper elements 1004" and 1014". Also, while the inner conical damper element 1001' is shown as being fully conical with a pointed tip 1001a', the inner conical damper element 1001" shown in FIG. 10G has a truncated tip 1001a" such that the conical damper element 1001" is frustoconical. The damper 1001" may be formed as a unitary molded member and may be formed of silicone rubber.

Figure 10H:
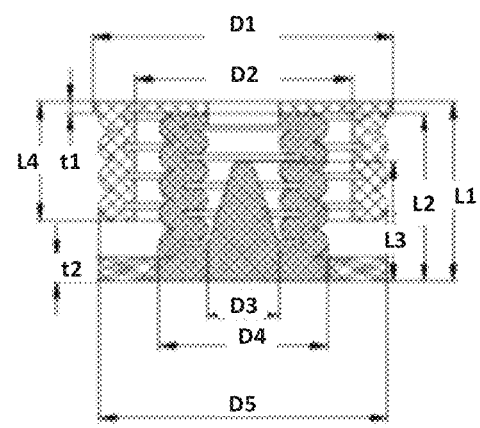
FIG. 10H illustrates dimensions of the damper along section 10G-10G in FIG. 10F.

As shown in FIG. 10H, the outer end 1034" has an outer diameter D1, which may be about 25 millimeters in embodiments. The outer cylindrical damper element 1014" may be defined by an outer diameter D5 and an inner diameter D2, which may, respectively, be about 24 millimeters and 18 millimeters in embodiments. The inner cylindrical damper element 1004" may be defined by an outer diameter D4 and an inner diameter D3, which is also the diameter of the base of the inner conical damper element 1001". In embodiments, the outer diameter D4 may be about 14 millimeters and the inner diameter D3 may be about 6 millimeters. Also, the outer end 1014a" or base of the outer cylindrical damper element 1014" has a thickness t1 which may, in embodiments, be about 1 millimeter. The head stabilizer 1003" may, in embodiments, have a thickness t2 of about 2 millimeters. The overall length L4 from the outer end 1034" of the damper 1000" to the inner end of the outer cylindrical damper element 1014" may be about 10 millimeters. The overall length L2 from the inner end of the damper to the tip 1001a" of the conical inner damper element 1001" may, in embodiments, be about 10 millimeters.

It will be appreciated that dampers 1000, 1000', or 1000" may substitute for damper 100 in system 101 and in helmet 400. Any modification to the dampers 1000, 1000', or 1000" or to system 101 to incorporate the dampers therein would be within the level of one of ordinary skill in the art. Also, it will be appreciated that dampers 1000, 1000', or 1000" may substitute for damper 150 in helmet 500, and for damper 700 in systems 710 and 810. Any modification to the dampers 1000, 1000', or 1000" or to helmet 500 or systems 710 and 810 to incorporate the dampers therein would be within the level of one of ordinary skill in the art.

Figure 11A:
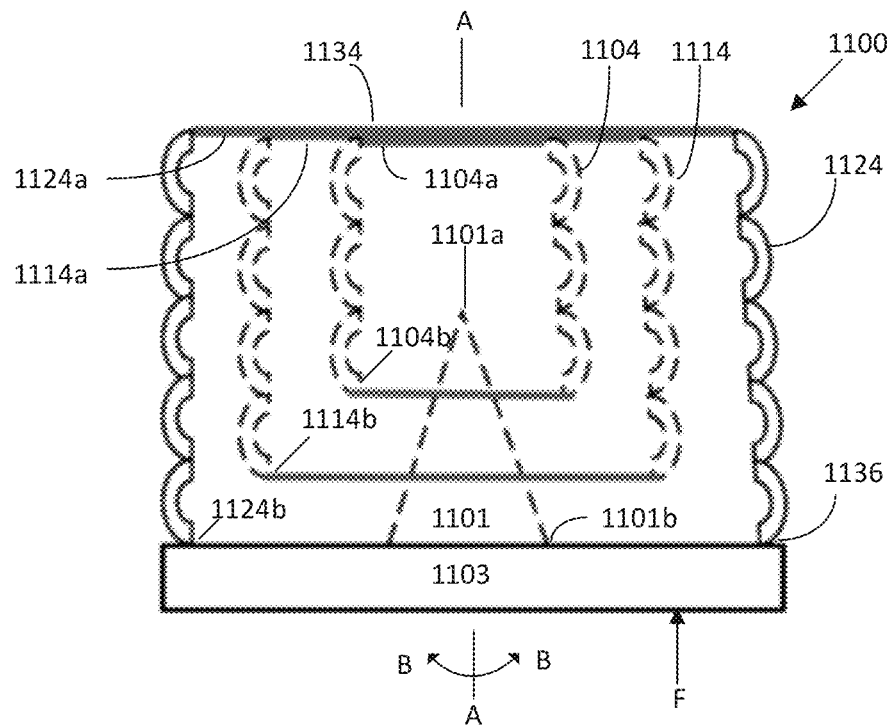
FIG. 11A is a center section view of another embodiment of a damper, in accordance with an aspect of the disclosure.

FIG. 11A shows an embodiment of a damper that combines some elements of dampers 100 and 700, as described in greater detail below. For example, the damper 1100 includes four elastic and compressible damper elements 1101, 1104, 1114, and 1124 that are coupled to a head stabilizer 1103, and that are concentric about axis A-A in FIG. 11A. The damper elements 1104, 1114, and 1124 are cylindrical and damper element 1101 is conical. The damper 1100 extends longitudinally along axis A-A from an outer end 1124 to an inner end 1136. The head stabilizer 1103 is attached to the damper 1100 at its inner end 1136. The three cylindrical damper elements 1104, 1114, and 1124 surround the conical damper element 1101, which is the innermost damper element in the damper 1100 shown in FIG. 11A. The damper 1100 is configured to be attached to a head covering, such as a headguard or a helmet.

In FIG. 11A the damper 1100 is shown in a neutral, uncompressed state. The damper 1100 is configured for longitudinal compression and expansion along axis A-A in response to translational impact force application to and removal from the damper 1100. The damper 1100 is also configured to deflect or bend laterally with respect to the axis A-A along an arc B shown in FIG. 11A in response to rotational forces applied to the damper 1100 during an impact. The damper 1100 is flexible and resilient and is configured to return to the neutral state when external impact forces are no longer applied to the damper 1100.

The cylindrical damper elements 1104, 1114, and 1124 may each be a spring or a flexible convoluted tube. The respective walls of the cylindrical damper elements 1104, 1114, and 1124 are longitudinally compressible and may be smooth or convoluted on their radially inner and/or outer sides.

The conical damper element 1101 has a tip 1101a and a base 1101b (which may be circular) longitudinally spaced along the axis A-A from the tip 1101a. The base 1101b may be fused or otherwise attached to the head stabilizer 1103. As shown in FIG. 11A, the tip 1101a of the cone 1101 is longitudinally disposed along axis A-A between the outer end 1134 of the damper 1100 and the head stabilizer 1103.

The head stabilizer 1103 may be free to move and may be separated from other dampers and structures or may be part of a portion of a liner that connects the head stabilizer to one or more other head stabilizers. An example of such a liner is liner 802 of FIGS. 8B and 8C.

In the example embodiment shown in FIG. 11A, the lengths of the cylindrical damper elements 1104, 1114, and 1124, as measured in their neutral state, are different from one another so that inner ends 1104b, 1114b, and 1124b of each respective damping element 1104, 1114, and 1124 are longitudinally spaced from each other. Specifically, in the example shown, the length of the cylindrical damper elements 1104, 1114, and 1124 along axis A-A increases with increasing radial distance away from the axis A-A such that the inner cylindrical damper element 1104 has a first length, the middle cylindrical damper element 1114 has a second length longer than the first length, and the outer cylindrical damper element 1124 has a third length that is longer than both the first and second lengths. The longitudinal and radial spacing of the inner ends 1104b, 1114b, and 1124b provides for various combinations of damper elements to become compressed based on the magnitude of impact force and bending moment applied to the damper, further details of which will be described in detail below.

The inner cylindrical damper element 1104 surrounds the conical damper element 1101 and extends from a base 1104a at the outer end 1134 of the damper 1100 to the inner end 1104b that is longitudinally disposed between the tip 1101a of the conical damper element 1101 and the inner end 1136 of the damper 1100. The middle cylindrical damper element 1114 surrounds the inner cylindrical damper element 1104 and the conical damper element 1101. The middle cylindrical damper element 1114 is radially spaced from the inner cylindrical damper element 1104. The middle cylindrical damper element 1114 extends from a base 1114a at the outer end 1134 of the damper 1100 to the inner end 1114b that is longitudinally spaced between the inner end of the inner cylindrical damper 1104b and the head stabilizer 1103. Thus, the middle cylindrical damper element 1114 has a length that is greater than the length of the inner cylindrical damper element 1104. The outer cylindrical damper element 1124 surrounds the middle cylindrical damper element 1114, the inner cylindrical damper element 1104, and the conical damper element 1101. The outer cylindrical damper element 1124 is radially spaced from the middle cylindrical damper element 1114. The outer cylindrical damper element 1124 extends from a base 1124a at the outer end 1134 of the damper 1100 to the inner end 1124b at the head stabilizer 1103, and to which the outer cylindrical damper element is connected. Thus, the outer cylindrical damper element 1124 has a length that is greater than the lengths of the middle and inner cylindrical damper elements 1114 and 1104.

The bases 1104a, 1114a, and 1124a of all of the cylindrical damper elements 1104, 1114, and 1124 may be joined together at the outer end 1134 of the damper 1100, and the outer end 1134 of the damper 1100 may be a mounting surface for mounting the damper 1100 to a surface of a head covering, such as a helmet or headband, examples of which are described above and additional examples are described in further detail below.

The damper 1100 may be made wholly or partially of silicone rubber with the conical damper element 1101 and the cylindrical damper elements 1104, 1114, 1124, and the head stabilizer 1103 all having the same density or different densities. Alternatively, the material forming the damper 1100 may include at least one of PORON®, ARMOURGEL™, D3O®, expanded thermoplastic urethane (ETPU), and other suitable materials. The damper 1100 may be formed of a unitary piece (e.g., integrally molded silicone rubber) or may be made from multiple pieces that are joined together during the manufacture of the damper 1100.

In one example of the damper 1100, the thickness of the cylindrical wall of the outer cylindrical damper element 1124 is greater than the thickness of the cylindrical wall of the middle cylindrical damper element 1114, and the thickness of the cylindrical wall of the middle cylindrical damper element 1114 is greater than the thickness of the cylindrical wall of the inner cylindrical damper element 1104. Also, while the longitudinal distance (length) between the tip 1101a of the conical damper element 1101 and its base 1101b is shown being less than the length of the damper 1100, the length of the conical damper element 1101 may be larger or smaller. For example, in one embodiment, the tip 1101a of the conical damper element 1101 may engage or otherwise contact the bases 1104a, 1114a, and 1124a of the cylindrical damper elements 1104, 1114, and 1124 in the neutral configuration so that the conical damper element 1101 may be initially compressed upon initial compression of the damper 1100, along with the outer cylindrical damper element 1124. Of course, shortening the length of the conical damper element 1101 (relative to the length shown in FIG. 11A) can delay the timing of its compression such that the cylindrical damper elements 1124, 1114, and 1104 may compress longitudinally outwardly a greater extent (as compared to the embodiment shown in FIG. 11A) during an impact before the conical damper element 1101 begins to compress.

In one example of the damper 1100, the base 1101b of the cone 1101 has a diameter of about 25.0 mm; the cone 1101 has a height of about 20.0 mm; the head stabilizer 1103 has a thickness of about 5.0 mm and has a diameter of about 54.0 mm; the outer cylindrical damper element 1124 has an outer diameter of about 54.0 mm and a wall thickness of about 2.5 mm; the outer cylindrical damper element 1124 has a longitudinal uncompressed length of about 25.0 mm; the middle cylindrical damper element 1114 has an outer diameter of about 45.0 mm and a wall thickness of about 3.0 mm; the middle cylindrical damper element 1114 has a longitudinal uncompressed length of about 20.0 mm; the inner cylindrical damper element 1104 has an outer diameter of about 35.0 mm and a wall thickness of about 5.0 mm); the inner cylindrical damper element 1104 has a longitudinal uncompressed length of about 15.0 mm. Such an example damper 1100 may absorb impacts up to 300 g's.

The compressibility of the damper 1100 may be based on the geometry and material properties of the damper 1100. For example, the compressibility of the conical damper element 1101 may be based on the geometry and of the material properties (e.g., density) of the conical damper element 1101. In the case of conical damper element 1101 being formed of one uniform material, due to the tapered profile of the cone, the compressibility of the cone 1101 may decreases along the axis A-A from the tip 1101a of the cone 1101 to the base 1101b of the cone 1101. Thus, as the cone 1101 is longitudinally compressed by a force, the force will be resisted by progressively stiffer (less compressible) conical damper element 1101.

On the other hand, the compressibility of one or more of cylindrical damper elements 1104, 1114, and 1124 may not be a function of position along axis A-A. Instead, the compressible damper elements 1104, 1114, and 1124 may exhibit a uniform compressibility with increasing compression, in similar manner to a linear, Hookean spring that has a spring constant. The compressibility of cylindrical damper elements 1104, 1114, and 1124 may be based on the thickness of their respective cylindrical walls, the number of damping coils (if the respective cylindrical damper element is a coil spring) or convolutions (if the respective cylindrical damper element is a compressible element is convoluted), and the material(s) forming the respective cylindrical damper element (e.g., silicone). The material(s) used and the values selected for compressibility or stiffness for each portion of the damper 1100 are selected to allow the damper 1100 to absorb repetitive impact forces including translational and rotational impacts.

Due to the staggered inner ends 1104b, 1114b, and 1124b of the cylindrical damper elements 1104, 1114, and 1124 and the configuration of the conical damper element 1101, the damper 1100 is configured so that the various damper elements may be engaged (e.g., compressed) in stages based on the amount of force transmitted to the damper. Initially following an impact, the translational and rotational impact forces will cause the one or more of the damper elements to compress based on their respective stiffnesses and will flex laterally based on the thickness, number of convolutions, and radial spacing between cylindrical damper elements 1104, 1114, and 1124.

FIG. 11A shows a translational force F applied to the head stabilizer 1103, which represents the translational force that may be exerted by a user's head to the head stabilizer 1103 during an impact. If the force F is large enough, the outer cylindrical damper element 1124 will compress first while the conical inner damper element 1101 and the head stabilizer 1103 move longitudinally outward along axis A-A. If the force F is still large enough, the head stabilizer 1103 may move further outward to engage or otherwise contact the inner end 1114b of the middle cylindrical damper element 1114, which will compress along with the outer cylindrical damper element 1124. If the force F is still large enough to move the head stabilizer 1103 further outward, then the tip 1101a of the conical damper element 1101 may engage or otherwise contact the bases 1104a, 1114a, and 1124a of the cylindrical damper elements 1104, 1114, and 1124 while the head stabilizer 1103 engages or otherwise contacts the inner end 1104b of the inner cylindrical damper element 1104. Thereafter, if the force F continues to cause the head stabilizer 1103 to move outwardly along axis A-A, all of the cylindrical damper elements 1104, 1114, and 1124 and the conical damper element 1101 will be further compressed until they are able to balance the force F without becoming fully compressed or until they are all fully compressed. Thereafter, the damper elements 1101, 1104, 1114, and 1124 are configured to elastically deform back to their neutral state shown in FIG. 11A, unless the deformation caused by the impact has permanently damaged the damper elements, in which case they will not return to their neutral state shown in FIG. 11A.

The radial spacing between the cylindrical damper elements 1104, 1114, and 1124 provides the damper 1100 with various levels of lateral stiffness to bend about the axis A-A in response to rotational forces transmitted to the damper during an impact event. For example, when the outer cylindrical damper element 1124 and the middle cylindrical damper element 1114 are engaged or otherwise contacted by the head stabilizer 1103, the area moment of inertia of the damper 1100 is effectively increased as compared to the stiffness of the damper 1100 shown in its neutral state in FIG. 11A. Also, when the inner, middle, and outer cylindrical damper elements 1104, 1114, and 1124 are compressed along with the conical damper element 1101, the area moment of inertia of the damper 1100 is effectively further increased. Thus, in other words, the multiple damper elements 1104, 1114, 1124, and 1101 can, in combination, increase the flexural rigidity of the damper 1100 as the damper compresses further in the outward direction. Thus, the multiple damper elements 1101, 1104, 1114, and 1124 can, when successively compressed, increase the flexural rigidity of the damper 1100 so that it will laterally deflect less under the same bending moment. Also, assuming that the materials, thicknesses, and dimensions of the damper elements in dampers 1000 and 1100 are the same, in comparison between dampers 1100 and 1000, in the neutral state the damper 1100 has a larger moment of inertia than the damper 1000, because the head stabilizer 1103 is directly attached to a cylindrical damper element 1124 that has a larger diameter than the inner cylindrical damper element 1024 of damper 1000. Thus, damper 1100 is flexurally stiffer than damper 1000, and thus, damper 1100 will deflect less about axis A-A than damper 1000 for the same bending moment.

Figure 11B:
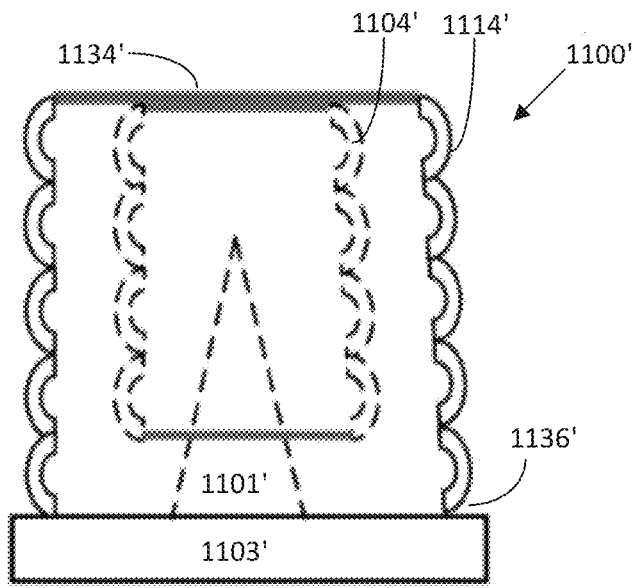
FIG. 11B is a center section view of another embodiment of a damper, in accordance with an aspect of the disclosure.

While three cylindrical dampers are shown in FIG. 11A, it will be appreciated that more or fewer than three cylindrical dampers may be used. For example, FIG. 11B shows a damper 1100' that is a modified version of the damper 1100 of FIG. 11A, that omits the outer cylindrical damper element 1124 and (and attaches the head stabilizer to the inner end of middle cylindrical damper element 1114') thus, reduces the overall lateral dimension of the damper 1100' compared to the damper 1100 of FIG. 11A. In the embodiment of the damper 1100', the cylindrical damper element 1114' is the outer cylindrical damper element.

It will be appreciated that other modifications of the damper 1100 may be made and are within the scope of the invention. For example, the length of the middle cylindrical damper element 1114 may be longer than the lengths of both of the outer cylindrical damper element 1124 and the inner cylindrical damper element 1104 and the head stabilizer 1103 may be attached to an inner end of the middle cylindrical damper element 1114.

Figure 11C:
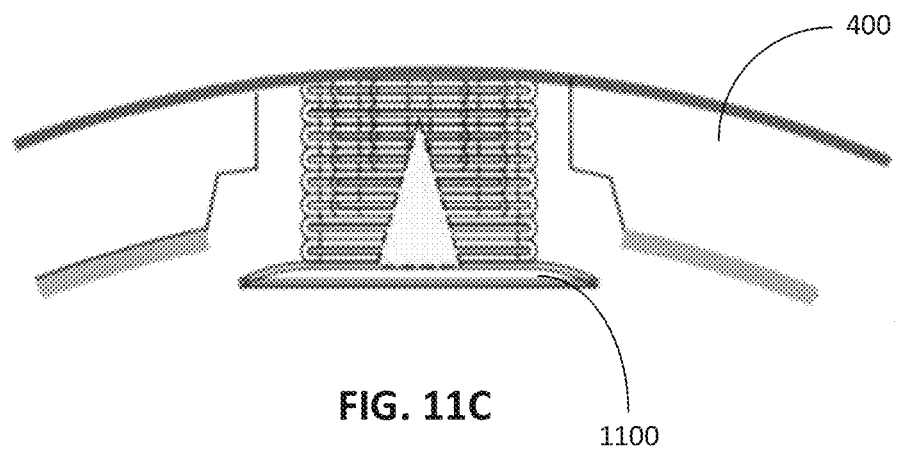
FIG. 11C is a center section view of the damper of FIG. 11A incorporated into the helmet of FIG. 4B
Figure 11D:
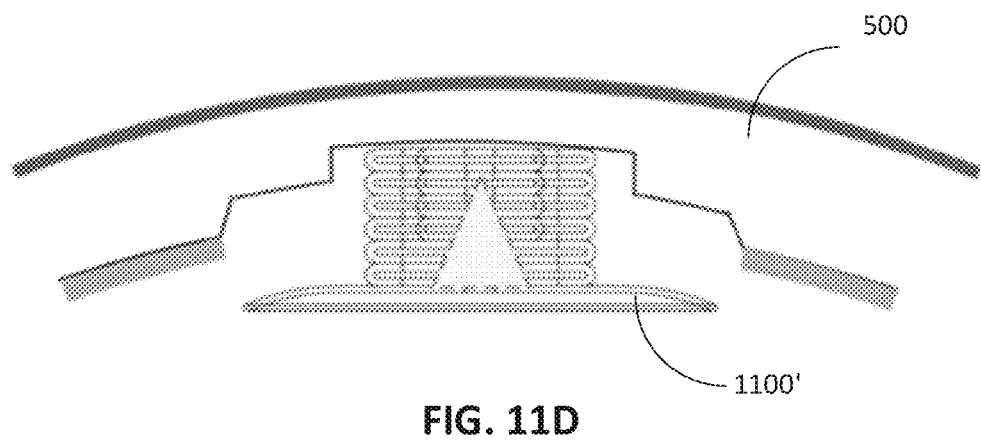
FIG. 11D is a center section view of the damper of FIG. 11B incorporated into the helmet of FIG. 5A.
Figure 11E:
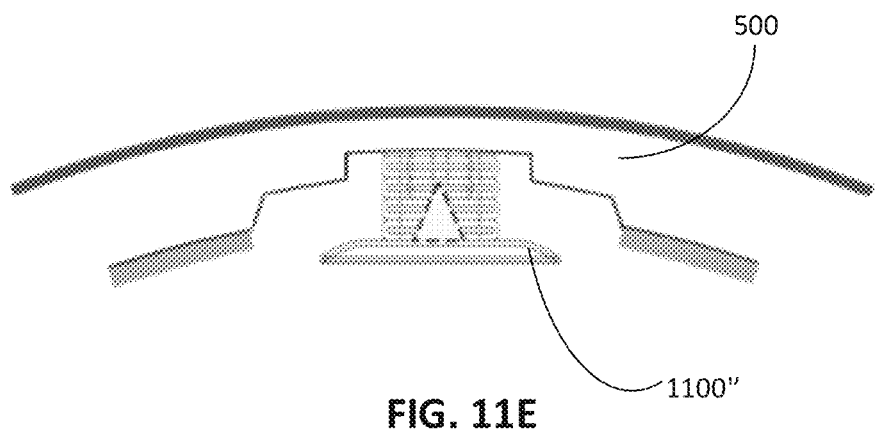
FIG. 11E is a center section view of an alternate of the damper of FIG. 11B incorporated into the helmet of FIG. 5F.

It will be appreciated that dampers 1100 or 1100' may substitute for damper 100 in system 101 and in helmet 400. FIG. 11C shows damper 1100 (in its neutral state) in helmet 400. Any modification to the dampers 1100 or 1100' or to system 101 to incorporate the dampers therein would be within the level of one of ordinary skill in the art. Also, it will be appreciated that dampers 1100 or 1100' may substitute for damper 150 in helmet 500, and for damper 700 in systems 710 and 810. FIG. 11D shows a damper 1100' (in its neutral state) in helmet 500. FIG. 11E shows a damper 1100" (with fewer convolutions and smaller dimensions than damper 1100' in FIG. 11D) in helmet 500. Any modification to the dampers 1100, 1100', 1100", or to helmet 500 or systems 710 and 810 to incorporate the dampers therein would be within the level of one of ordinary skill in the art.

Figure 11F:
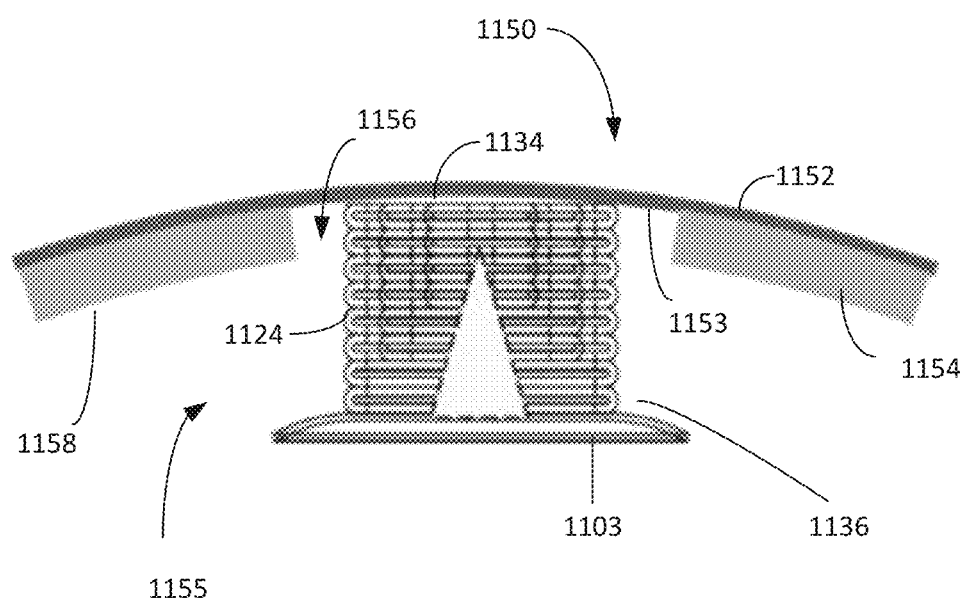
FIG. 11F is a center section view of the damper of FIG. 11A incorporated into another embodiment of a helmet.

FIG. 11F shows a portion of another embodiment of a helmet 1150, which incorporates at least one damper 1100. Though not shown in FIG. 11F, in addition to damper 1100, the helmet 1150 may include other dampers 1100 and/or other dampers described herein. The helmet 1150 includes an outer shell 1152 and an inner liner 1154 attached to an inner side 1153 of the outer shell 1152. The inner liner 1154 defines an inner space 1155 for receiving a head of a user. The outer shell 1152 is preferably harder and stiffer than the inner liner 1154, which is preferably a softer, elastic material. The outer shell 1152 may be made, without limitation, of fiberglass or polycarbonate. The inner liner 1154 may be made of ethylene-vinyl acetate (EVA). The inner side 1153 of the outer shell 1152 may be substantially covered by the inner liner 1154 except for bore holes 1156 formed in the inner liner 1154 through which damper 1100 extends outwardly to the outer shell 1152. The outer end 1134 of the damper 1100 is connected to the inner side 1153 of the outer shell 1152 and may be connected by an adhesive or by mechanical fastener. The outer cylindrical damper element 1124 is laterally spaced from the inner liner 1154 surrounding the bore hole 1156. The inner end 1136 of the damper 1100 is longitudinally spaced from an inner side 1158 of the inner liner 1154 and the head stabilizer 1103 is free to move laterally and longitudinally in the interior space 1155. When the helmet 1150 is used by a user the head stabilizer 1103 may engage or otherwise contact the user's head and may initially cause some compression of the damper 1100 from the initial neutral state, even in the absence of any external impact forces being applied to the helmet 1150. However, the damper 1100 is designed so that the head stabilizer 1103 and the outer cylindrical damper element 1124 will remain spaced laterally and longitudinally from the inner liner 1154 even when the helmet 1150 is placed on the user's head and not subject to external impact forces.

Figure 12:
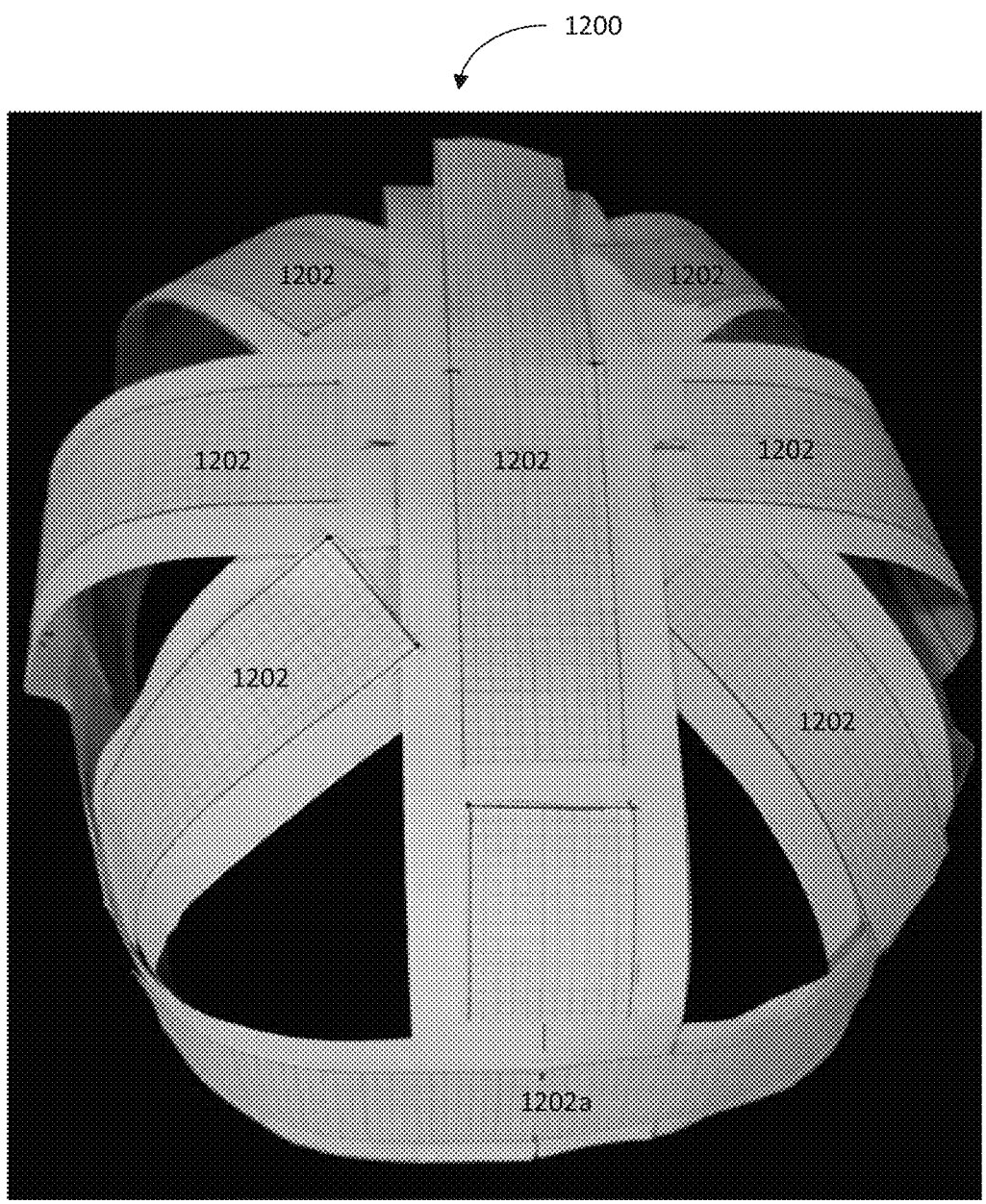
FIG. 12 shows an embodiment of a portion of a headband or headguard.

Any of the dampers described herein can be integrated into a protective headband, such as headguard 1200 shown in FIG. 12. The headguard 1200 includes a plurality of straps 1202 coupled together and formed into a generally concave structure which can be placed on and around the head (not shown) of a user. At least one strap 1202a of the plurality of straps 1202 forms a loop or band to wrap around the forehead and back of the user's head. One or more of the embodiments of dampers described herein may be attached at their respective outer ends to one or more of the straps 1202 on the concave (inner) side of the headband 1200 so that respective inner ends of the dampers are directed inward and are spaced longitudinally along their respective axes from the straps 1202. In cases where the attached dampers include head stabilizers, such as dampers 1000 and 1100, the head stabilizers are free to move and are not connected to one another. When a user places the headband on their head, the head stabilizers are configured to contact and otherwise engage the head so that the damper spaces the straps of the headband from the head in the neutral position of the dampers.

The straps 1202 are preferably made of a durable, washable material so that the headband 1200 can be reused between washings without damage to the straps 1202 or the dampers attached to the straps 1202. For example, the straps 1202 may be made of the same material as the dampers and may be integrally formed with the dampers. Thus, in one embodiment, the straps 1202 and the dampers may be completely made of silicone rubber. Alternatively, the straps 1202 may be made of a material that differs from the material of the dampers. For example, the straps 1202 may be made of ethylene-vinyl acetate (EVA) coated with vinyl, while the dampers are made of silicone rubber. The straps 1202 may have a width that is at least as wide (in the transverse direction) as the dampers so that the outer ends of the respective dampers are covered by the corresponding strap 1202 to which the damper is attached.

Figure 13A:
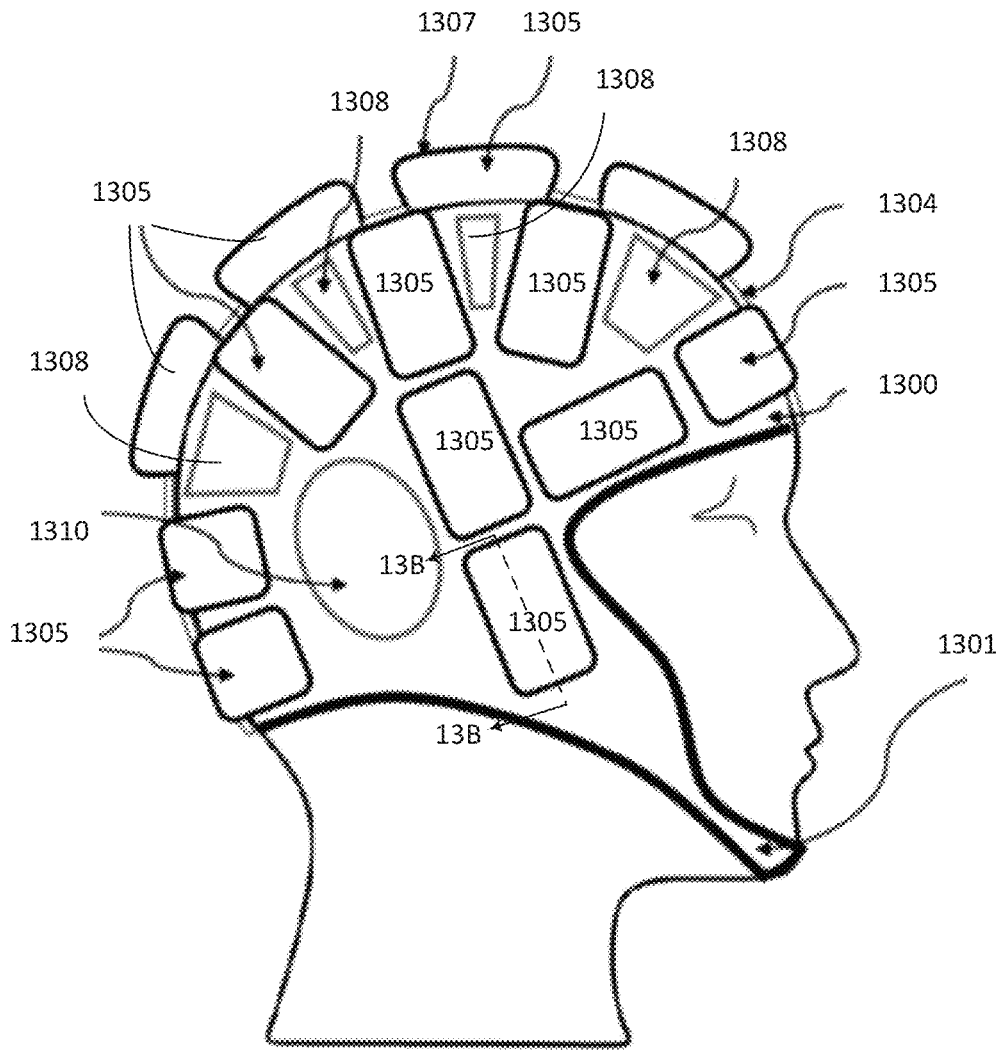
FIG. 13A illustrates an embodiment of a headguard in accordance with an aspect of the disclosure.

FIG. 13A shows another example of a headguard 1300 that may be worn by a user.

While only one side (i.e., right side) of the headguard 1300 is shown in FIG. 13A, the other side that is not shown in FIG. 13A is symmetrical with the side shown. The headguard 1300 may have an inner layer 1304 that may be made of ethylene-vinyl acetate (EVA) and covered or at least partially surrounded with vinyl. The inner layer 1304 may cover substantially all of the user's head, but may have openings defined therein, such as openings 1310 for user's ears. Also, the outer layer 1304 may define one or more ventilation openings 1308. The headguard 1300 may optionally have a chin strap 1301 that extends from both sides of the headguard under the chin of the user. The chin strap 1301 may be adjustable and/or elastic and may be integrally formed with the inner layer 1304.

The headguard 1300 also includes pockets or chambers 1305 that extend outward from the inner layer 1304. Each chamber 1305 is formed between the inner layer 1304 and an outer layer 1307, which extends from the inner layer 1304 to at partially surround one or more of the dampers described herein. The outer layer 1307 may be made of the same material as the inner layer 1304, and may, in at least one embodiment, be made of ethylene-vinyl acetate (EVA) and covered or at least partially surrounded with vinyl. At least one chamber 1305 is located on one or more sides of the headguard 1300. For example, in the example of the headguard 1300 shown in FIG. 13A, chambers 1305 are located on the left, right, top, back, and front sides of the headguard 1300. An example of the interior construction of one chamber 1305 is shown in greater detail in FIGS. 13B and 13C, further details of which are described herein.

Figure 13B:
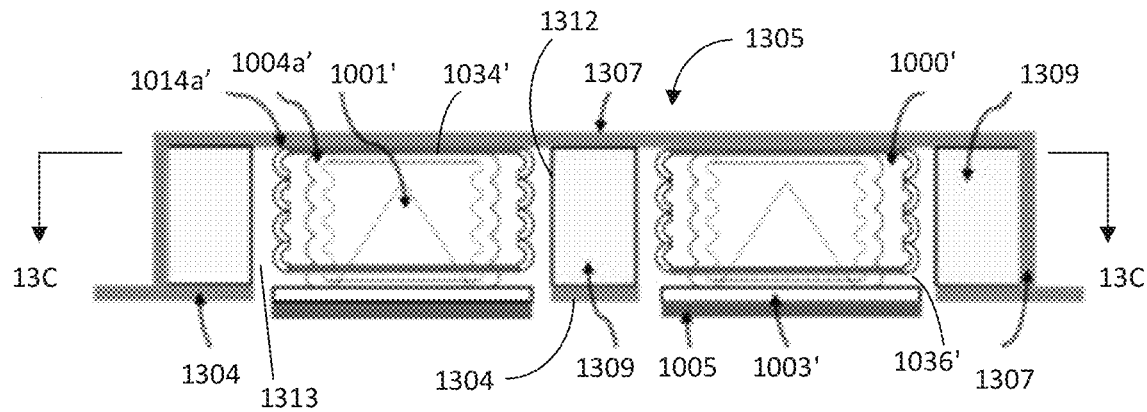
FIG. 13B illustrates a portion of the headguard viewed along section 13B-13B in FIG. 13A.
Figure 13C:
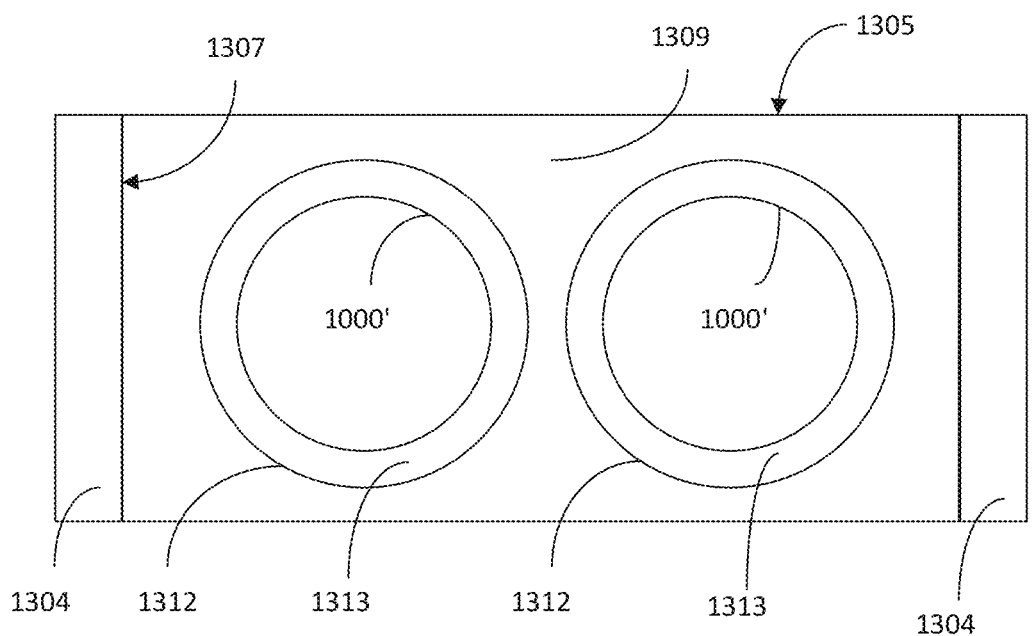
FIG. 13C illustrates a portion of the headguard viewed along section 13C-13C in FIG. 13B.

FIGS. 13B and 13C show details of the interior one of the chambers 1305 in FIG. 13A. The chamber 1305 shown in FIGS. 13B and 13C encapsulates two dampers, which are shown as being dampers 1000' of FIG. 10B. The outer ends 1034' of each damper 1000' are attached to an inner side of the outer layer 1307 and the head stabilizers 1003' of each damper 1000' extend inwardly and are free to move relative to each other (i.e., they are not connected to one another). Optionally, a comfort layer 1005 may be attached to an inner side of the head stabilizers 1003' of the dampers 1000', as shown in FIG. 13B.

Also in the chamber 1305 is a layer of foam padding 1309 that surrounds each of the dampers 1000'. Specifically, the foam padding 1309 defines boreholes 1312 in which each damper 1000' is disposed. The foam padding 1309 inside the chamber 1305 may be enclosed by ethylene-vinyl acetate (EVA) and covered in vinyl. Such covering may also line the walls of the boreholes 1312 so that the foam padding 1309 is encapsulated by the ethylene-vinyl acetate and vinyl. The diameter of each borehole 1312 is larger than the outer diameter of the corresponding damper 1000' therein so that there is an annular space or gap 1313 between the damper 1000' and the padding 1309. The gap 1313 affords the damper 1000' some freedom of movement laterally in the borehole 1312 before the damper 1000' engages the padding 1309. Of course, if the damper 1000' deflects laterally and engages the padding 1309, such engagement will cause a damping effect to absorb some energy. The padding 1309 is sandwiched between the outer layer 1307 and the inner layer 1304.

In one embodiment, the lateral width of the chamber is about 64 mm and the longitudinal height of the chamber is about 16 mm. Also, the heights (in the longitudinal direction) of the inner cylindrical damper element 1004' and the padding 1309 may be about 12 mm, the height of the outer cylindrical damper element 1014' may be about 10 mm, and the height of the conical damper element 1001' may be about 8 mm. The outer diameter (in the lateral direction) of the inner cylindrical damper element 1004' may be about 12 mm, the outer diameter of the outer cylindrical damper element 1014' may be about 20 mm, the outer diameter of the base 1101b' of the conical damper element 1101' may be about 8 mm, and the outer diameter of the head stabilizer 1003' may be about 20 mm. The annular gap between the outer cylindrical damper element 1014' and the padding 1309 may be about 2 mm, and the annular gap between the inner and outer cylindrical damper elements 1004' and 1014' may be about 2 mm. The longitudinal distance between the tip 1001a' of the conical damper element 1001' and the outer end 1034' of the damper 1000' may be about 2 mm to 4 mm. The thickness (in the lateral direction) of the cylindrical wall of the outer cylindrical damper element 1014' may be about 3 mm, the thickness of the cylindrical wall of the inner cylindrical damper element 1104' may be about 2 mm. The height (in the longitudinal direction) of the head stabilizer 1003' may be about 2 mm and the height of optional comfort layer 1005 attached to the head stabilizer 1003' may have a thickness of about 2 mm.

Figure 13D:
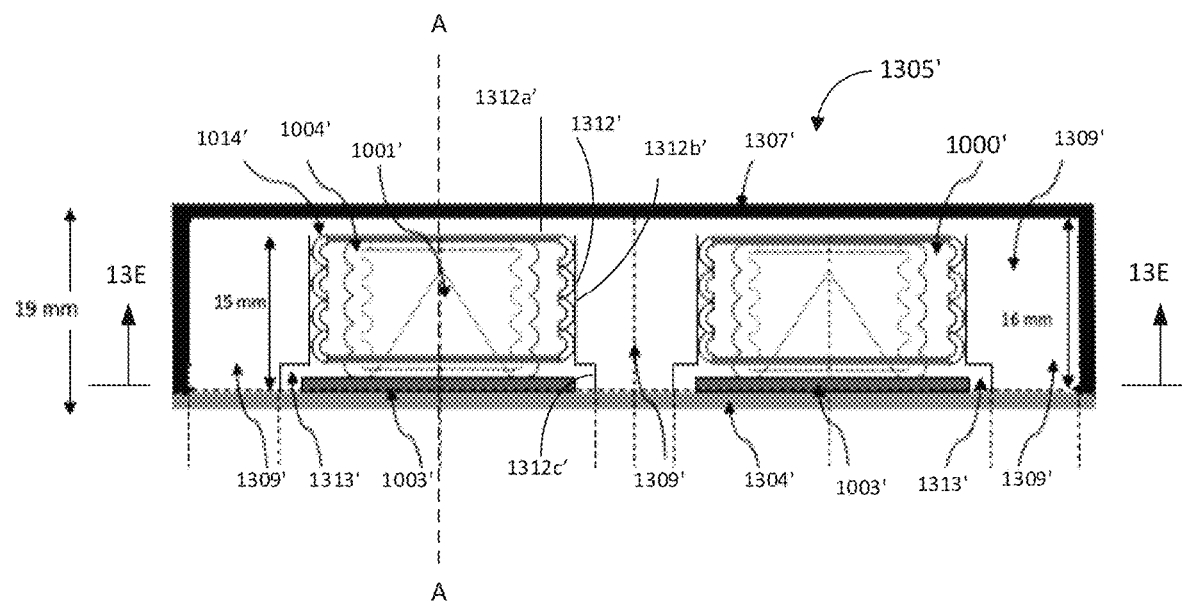
FIG. 13D illustrates an alternative embodiment of a portion of the headguard viewed along section 13B-13B in FIG. 13A.
Figure 13E:
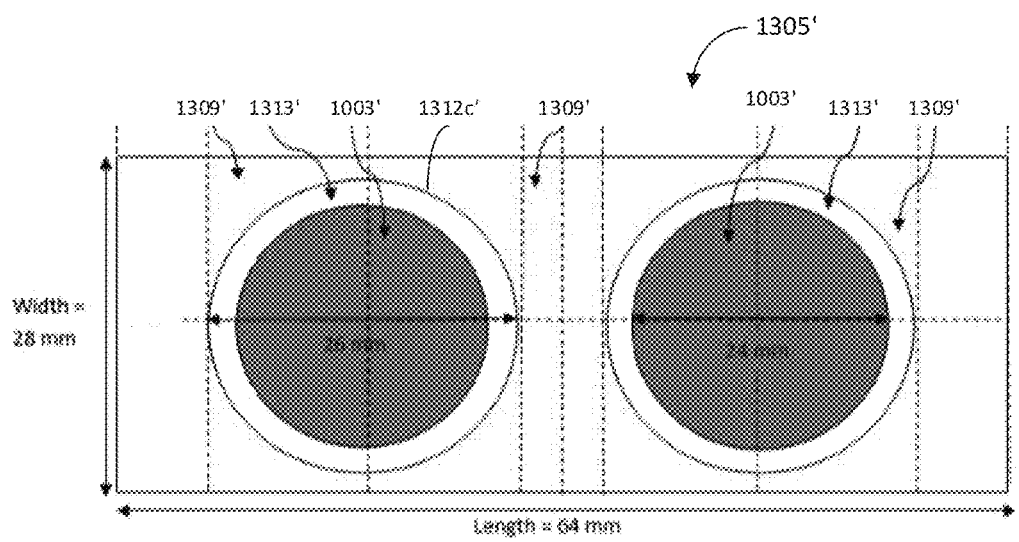
FIG. 13E illustrates the portion shown in FIG. 13D along section 13E-13E in FIG. 13D.

FIGS. 13D and 13E show an alternate embodiment of a chamber 1305, denoted 1305', in a neutral (i.e., uncompressed) state. In FIGS. 13D and 13E, elements corresponding to chamber 1305 in FIGS. 13B and 13C are appended with a "'". Thus, the chamber 1305' shown in FIGS. 13D and 13E encapsulates padding 1309' between an outer layer 1307' and an inner layer 1304'. The outer layer 1307' may be formed of vinyl and the inner layer 1304' may be formed of a stretchable material, such as EVA. The inner layer 1304' may also include or be integrated with a comfort layer 1005', which also may be made of EVA. The padding 1309' may be made from EVA foam.

The padding 1309' defines at least one borehole 1312' that receives a corresponding damper 1000'. Thus, as shown in FIG. 13D, each damper 1000' is radially surrounded by the padding 1309'. Two boreholes 1312' and two dampers 1000' are shown in FIGS. 13D and 13E. Although dampers 1000' are shown in FIGS. 13D and 13E, other dampers described herein may be used as well, such as dampers 1000" shown in FIGS. 10C to 10H. As shown in FIG. 13D, the inner layer 1304' extends laterally transverse across the boreholes 1312' covering the boreholes 1312' and the dampers 1000' inside the boreholes 1312'. The dampers 1000' are fixed at their outer ends 1034' to the padding 1309' at an outer end or base 1312a' of the borehole 1312'. The outer end 1312a' is shown being spaced longitudinally inwardly from the outer layer 1307'. Thus, the dampers 1000' are retained between the outer end 1312a' of the borehole 1312' and the inner layer 1304'. The dampers 1000', while in contact with the inner layer 1304' at the head stabilizer 1003', are not fixed to the inner layer 1304'. This permits relative movement between the interface between the dampers 1000' and the inner layer 1304' at the head stabilizer 1003'.

The boreholes 1312' have different geometry than the borehole 1312 in FIGS. 13B and 13C. Specifically, the borehole 1312' is shown having varying diameter along its longitudinal length. Specifically, the borehole 1312' has a longitudinally outer portion 1312b' having a first diameter and a longitudinally inner portion 1312c' having a second diameter that is larger than the first diameter and is larger than the diameter of the head stabilizer 1003' to provide an annular gap 1313' between the head stabilizer 1003' and the therebetween to accommodate lateral movement (transverse to longitudinal axis A-A) of the head stabilizer 1003' relative to the inner layer 1304', which, as noted above, is not fixed to the head stabilizer 1003'. The first diameter of the borehole 1312' is nearly equal (slightly larger) to the outer diameter of the outer cylindrical damper element 1014' to permit free longitudinal compression and expansion of the damper 1000' in the borehole 1312', but inhibits or prevents lateral deflection of the outer cylindrical damper element 1014' relative to the borehole 1312'. The annular gap 1313' affords the damper 1000' some lateral freedom of movement in the borehole 1312' before the damper 1000' engages the padding 1309'.

The foam padding 1309' inside the chamber 1305' may be enclosed by ethylene-vinyl acetate (EVA) and covered in vinyl. Such covering may also line the walls of the boreholes 1312' so that the foam padding 1309' is encapsulated by the ethylene-vinyl acetate and vinyl.

As shown in FIG. 13E, in one embodiment, the length of the chamber is about 64 mm and the width of the chamber is about 28 mm. Also, as shown in FIG. 13D, the heights (in the longitudinal direction along axis A-A) of the inner cylindrical damper element 1004' and the padding 1309' inside the chamber between the interior surfaces of the outer layer 1307' and the inner layer 1304' may be about 16 mm, the height of the damper 1000' in its neutral state in FIG. 13D is about 15 mm. The annular gap 1313' between the outer cylindrical damper element 1014' and the padding 1309' of the inner portion of the borehole 1312' may be about 1 mm.

There have been described and illustrated herein several embodiments of a head protection system. While particular embodiments of the invention have been described, it is not intended that the invention be limited thereto, as it is intended that the invention be as broad in scope as the art will allow and that the specification be read likewise. Thus, while particular damper arrangements have been disclosed, it will be appreciated that other arrangements may be used as well. In addition, while particular types of materials have been disclosed for the dampers, it will be understood that other suitable materials can be used. Also, while certain embodiments have been described with reference to protection for one human body part (i.e., the human head), it will be appreciated that the disclosure is applicable to protection for other parts of the human body as well which may be subject to translational and/or rotational impact forces, such as shoulders, knees, and elbows. Thus, while reference has been made throughout the disclosure to certain example embodiment of body protectors that protect the head as a body part, it will be appreciated that the same or similar structures may be used for the protection of human body parts other than the head, such as the shoulders, knees, and elbows. It will therefore be appreciated by those skilled in the art that yet other modifications could be made to the provided invention without deviating from its spirit and scope as claimed.

What is claimed is:

1. A protector for protecting a body part of a human user from impact forces, the protector comprising:
   an inner layer configured to contact the body part;
   at least one outer layer operably coupled to the inner layer, wherein the at least one outer layer defines an opening having an outer end and an inner end, the opening extending along a longitudinal axis from the outer end to the inner end;
   a plurality of compressible damper elements disposed within the opening, each compressible damper element of the plurality of compressible damper elements extending in an uncompressed state along the longitudinal axis of the opening and being surrounded by the opening, wherein each compressible damper element of the plurality of compressible damper elements has an outer end disposed longitudinally opposite an inner end; and
   an engagement member operably coupled to the plurality of compressible damper elements, wherein the engagement member is configured to couple to the body part of the user in response to the protector being placed on the body part;
   wherein the plurality of compressible damper elements includes a radially inner damper element and at least one radially outer damper element, the at least one radially outer damper element being configured in the uncompressed state to at least partially surround the radially inner damper element with a radial offset therebetween;
   wherein the engagement member is further configured to move laterally relative to the at least one outer layer under an impact force that moves the user's body part relative to the at least one outer layer, and wherein at least one compressible damper element of the plurality of compressible damper elements is configured to absorb energy by compression and flexion under the impact forces that move the body part relative to the at least one outer layer.

2. The protector according to claim 1, wherein:
the engagement member is disposed at the inner end of one compressible damper element of the plurality of compressible damper elements.

3. The protector according to claim 1, wherein:
the engagement member is disposed within the opening.

4. The protector according to claim 1, wherein:
the engagement member is disposed outside the opening.

5. The protector according to claim 1, wherein:
a combined length of the plurality of compressible damper elements and the engagement member along the longitudinal axis is equal to or greater than the length of the opening along the longitudinal axis.

6. The protector according to claim 1, wherein:
the opening is part of a plurality of openings defined by the at least one outer layer, wherein the plurality of openings are spaced apart from one another and configured to be positioned about the body part, wherein each opening of the plurality of openings surrounds a respective plurality of compressible damper elements;
the engagement member is part of a plurality of engagement members of the protector, wherein the plurality of engagement members correspond to the plurality of openings, wherein each engagement member is operably coupled to the respective plurality of compressible damper elements surrounded by the corresponding opening;
at least one engagement member of the plurality of engagement members is configured to move laterally relative to the at least one outer layer under the impact force that moves the body part relative to the at least one outer layer, and
at least one compressible damper element of the plurality of compressible damper elements surrounded by the plurality of openings is configured to absorb energy by compression and flexion under the impact forces that move the body part relative to the at least one outer layer.

7. The protector according to claim 1, wherein:
the respective compressible damper elements of the plurality of compressible damper elements have fixed outer ends that are longitudinally spaced from each other.

8. The protector according to claim 7, wherein:
the plurality of compressible damper elements are supported by a stepped outer end.

9. The protector according to claim 1, wherein:
the radially inner damper element of the plurality of compressible damper elements comprises a conical damper element that is connected to the engagement member; and
the at least one radially outer damper element of the plurality of compressible damper elements comprises at least one cylindrical damper element configured in the uncompressed state to at least partially surround the conical damper element with a radial offset therebetween and connect to the engagement member.

10. The protector according to claim 9, wherein:
the conical damper element has a stiffness that is a function of longitudinal position along the conical damper element.

11. The protector according to claim 1, wherein:
the radially inner damper element of the plurality of compressible damper elements comprises a conical damper element that is connected to the engagement member; and
the at least one radially outer damper element of the plurality of compressible damper elements comprises a plurality of cylindrical damper elements configured in the uncompressed state to at least partially surround the conical damper element with a radial offset therebetween, wherein the plurality of cylindrical damper elements are radially spaced from one another and have inner ends that are longitudinally spaced from one another.

12. The protector according to claim 11, wherein:
at least one of the plurality of cylindrical damper elements has an inner end connected to the engagement member.

13. The protector according to claim 11, wherein:
the plurality of cylindrical damper elements includes a first cylindrical damper element that extends longitudinally from an outer end to an inner end in the uncompressed state, wherein the first cylindrical damper element has a length between the outer and inner ends of the first cylindrical damper element, and wherein the conical damper element in the uncompressed state, has a length that is less than the length of the first cylindrical damper element.

14. The protector according to claim 13, wherein:
the conical damper element has a base disposed opposite a tip, and wherein the inner end of the first cylindrical damper element is disposed adjacent the base of the conical damper element and the outer end of the first cylindrical damper element is spaced longitudinally from the tip of the conical damper element.

15. The protector according to claim 14, wherein:
the base of the conical damper and the inner end of the first cylindrical damper element are disposed adjacent the engagement member.

16. The protector according to claim 13, wherein:
the plurality of cylindrical damper elements includes a second cylindrical damper element configured in the uncompressed state to at least partially surround both the first cylindrical damper element and the conical damper element.

17. The protector according to claim 1, wherein:
the plurality of compressible damper elements extend inwardly from the at least one outer layer.

18. The protector according to claim 1, wherein:
the at least one outer layer comprises an outer shell or outer cover, and the plurality of compressible damper elements extend inwardly from the outer shell or outer cover.

19. The protector according to claim 1, wherein:
the at least one outer layer comprises an outer cover and foam padding, and the plurality of compressible damper elements extend inwardly from the foam padding.

20. The protector according to claim 1, wherein:
the at least one outer layer comprises an outer cover, and the plurality of compressible damper elements are spaced inwardly from the outer cover.

21. The protector according to claim 1, wherein:
the plurality of compressible damper elements extend inwardly through the opening beyond the inner layer.

22. The protector according to claim 1, wherein:
the plurality of compressible damper elements extend inwardly through the opening to the engagement member, wherein the engagement member interfaces to the inner layer.

23. The protector according to claim 1, wherein:
the plurality of compressible damper elements are formed from an energy absorbing material.

24. The protector according to claim 1, wherein:
the body part is a head of the user; and
wherein the inner layer defines an interior space that is configured to be occupied by the head of the user.

25. The protector according to claim 1, wherein:
the plurality of compressible damper elements extends inwardly through the opening beyond the inner layer to the engagement member disposed beyond the inner layer.

26. The protector according to claim 1, wherein:
the radially inner damper element comprises a first cylindrical damping element; and
the at least one radially outer damper element comprises a second cylindrical damping element configured in the uncompressed state to at least partially surround the first cylindrical damping element with a radial offset therebetween.

* * * * *